US010956840B2

(12) United States Patent
Sudo et al.

(10) Patent No.: US 10,956,840 B2
(45) Date of Patent: Mar. 23, 2021

(54) INFORMATION PROCESSING APPARATUS FOR DETERMINING USER ATTENTION LEVELS USING BIOMETRIC ANALYSIS

(71) Applicant: KABUSHIKI KAISHA TOSHIBA, Tokyo (JP)

(72) Inventors: Takashi Sudo, Tokyo (JP); Akira Tanaka, Tokyo (JP); Kenichi Doniwa, Saitama (JP); Hiroaki Komaki, Tokyo (JP); Hiroki Kumagai, Tokyo (JP); Yasuhiro Kanishima, Tokyo (JP); Nobuhide Okabayashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1117 days.

(21) Appl. No.: 14/979,232

(22) Filed: Dec. 22, 2015

(65) Prior Publication Data
US 2017/0068925 A1 Mar. 9, 2017

(30) Foreign Application Priority Data
Sep. 4, 2015 (JP) .............................. JP2015-174467

(51) Int. Cl.
*G06Q 10/06* (2012.01)
*G06F 1/16* (2006.01)
*G06F 3/01* (2006.01)

(52) U.S. Cl.
CPC ..... *G06Q 10/063114* (2013.01); *G06F 1/163* (2013.01); *G06F 3/011* (2013.01); *G06F 2203/011* (2013.01)

(58) Field of Classification Search
CPC . G06Q 10/063114; G06F 3/011; G06F 1/163; G06F 2203/011
See application file for complete search history.

(56) References Cited

U.S. PATENT DOCUMENTS

| | | | | |
|---|---|---|---|---|
| 7,007,067 B1* | 2/2006 | Azvine | ................... | G06F 3/011 709/202 |
| 8,024,415 B2* | 9/2011 | Horvitz | ................ | G05B 19/404 709/207 |
| 2003/0046401 A1* | 3/2003 | Abbott | ..................... | G06F 9/451 709/228 |
| 2004/0098462 A1* | 5/2004 | Horvitz | ................ | G05B 19/404 709/207 |

(Continued)

FOREIGN PATENT DOCUMENTS

| | | |
|---|---|---|
| JP | H05-211650 A | 8/1993 |
| JP | H10-147411 A | 6/1998 |

(Continued)

OTHER PUBLICATIONS

Non-intrusive Multimodal Attention Detection J Sun, MX Huang, G Ngai, SCF Chan—2014—Citeseer (Year: 2014).*

(Continued)

*Primary Examiner* — Jonathan G Sterrett
(74) *Attorney, Agent, or Firm* — Rutan & Tucker, LLP

(57) ABSTRACT

According to one embodiment, a method includes receiving biometric information about a living body of a user wearing an eyeglasses-type wearable terminal and working in a predetermined range, from the eyeglasses-type wearable terminal, and estimating that the user is concentrating, based on the received biometric information.

24 Claims, 12 Drawing Sheets

(56) References Cited

U.S. PATENT DOCUMENTS

| | | | | |
|---|---|---|---|---|
| 2006/0029198 | A1* | 2/2006 | Dorneich | A61B 5/0002 379/88.22 |
| 2007/0288932 | A1* | 12/2007 | Horvitz | G06Q 10/107 719/313 |
| 2010/0308999 | A1* | 12/2010 | Chornenky | G08B 6/00 340/573.1 |
| 2011/0206283 | A1* | 8/2011 | Quarfordt | G06K 9/0061 382/220 |
| 2011/0261049 | A1* | 10/2011 | Cardno | G06Q 10/10 345/419 |
| 2013/0006064 | A1* | 1/2013 | Reiner | A61B 5/4884 600/300 |
| 2013/0027208 | A1* | 1/2013 | Tao | G08B 21/06 340/575 |
| 2013/0278492 | A1* | 10/2013 | Stolarz | G06F 3/01 345/156 |
| 2014/0007010 | A1* | 1/2014 | Blom | G06F 3/011 715/825 |
| 2014/0145079 | A1 | 5/2014 | Omino | |
| 2014/0152792 | A1* | 6/2014 | Krueger | A61M 21/00 348/78 |
| 2014/0206323 | A1 | 7/2014 | Scorcioni | |
| 2014/0240484 | A1 | 8/2014 | Kodama et al. | |
| 2014/0351191 | A1 | 11/2014 | Kon et al. | |
| 2015/0310380 | A1* | 10/2015 | Acres | G06Q 10/063116 705/7.16 |
| 2016/0022167 | A1* | 1/2016 | Simon | A61B 5/04842 600/301 |

FOREIGN PATENT DOCUMENTS

| | | |
|---|---|---|
| JP | 2000-354943 A | 12/2000 |
| JP | 2002-288294 A | 10/2002 |
| JP | 2003-196681 A | 7/2003 |
| JP | 2003-216687 A | 7/2003 |
| JP | 2004-102727 A | 4/2004 |
| JP | 2008-201569 A | 9/2008 |
| JP | 2009-279193 A | 12/2009 |
| JP | 2010-271928 A | 12/2010 |
| JP | 2011-081737 A | 4/2011 |
| JP | 2011-118683 A | 6/2011 |
| JP | 2012-191456 A | 10/2012 |
| JP | 2012-191624 A | 10/2012 |
| JP | 2012-212991 A | 11/2012 |
| JP | 2013-020422 A | 1/2013 |
| JP | 2013258555 A | 12/2013 |
| JP | 2014100227 A | 6/2014 |
| JP | 2014-164482 A | 9/2014 |
| JP | 2014-228725 A | 12/2014 |
| JP | 201560790 A | 3/2015 |
| JP | 2015-075832 A | 4/2015 |
| JP | 2015-088175 A | 5/2015 |

OTHER PUBLICATIONS

Empathic tutoring software agents using real-time eye tracking H Wang, M Chignell, M Ishizuka— . . . of the 2006 symposium on Eye . . . , 2006—dl.acm.org (Year: 2006).*

"Construction equipment activity recognition for simulation input modeling using mobile sensors and machine learning classifiers", R Akhavian, AH Behzadan—Advanced Engineering Informatics, 2015—Elsevier (Year: 2015).*

Eye-q: Eyeglass peripheral display for subtle intimate notifications, E Costanza, SA Inverso, E Pavlov, R Allen . . . —Proceedings of the 8th . . . , 2006—dl.acm.org (Year: 2006).*

NotifEye: using interactive glasses to deal with notifications while walking in public A Lucero, A Vetek—Proceedings of the 11th Conference on Advances in . . . , 2014—dl.acm.org (Year: 2014).*

* cited by examiner

| Worker ID | Position information | Status |
|---|---|---|
| HO_0001 | Xu1,Yu1 | Working |
| HO_0002 | Xu2,Yu2 | Moving |
| HO_0003 | Xu3,Yu3 | Waiting |
| ... | ... | ... |

F I G. 12

| Device ID | Manufacture start time | Work name | Status |
|---|---|---|---|
| M_0001 | 10 : 00 | Work A | Manufacturing |
| M_0002 | 10 : 30 | Work B | Preparation complete |
| M_0003 | 11 : 30 | Work C | Preparation incomplete |
| M_0004 | 12 : 30 | Work D | Preparation incomplete |
| ... | ... | ... | ... |

F I G. 13

| Device ID | Manufacture start time | Work name | Status | Continuation flag | |
|---|---|---|---|---|---|
| M_0001 | 10 : 00 | Work A | Manufacturing | ○ | ~471a |
| M_0002 | 10 : 30 | Work B | Preparation complete | ○ | ~472a |
| M_0003 | 11 : 30 | Work C | Preparation incomplete | × | ~473a |
| M_0004 | 12 : 30 | Work D | Preparation incomplete | × | ~474a |
| ... | ... | ... | ... | ... | |

| Device ID | Position information | Device risk | |
|---|---|---|---|
| M_0001 | Xd1,Yd1 | 5 | ~481 |
| M_0002 | Xd2,Yd2 | 4 | ~482 |
| M_0003 | Xd3,Yd3 | 1 | ~483 |
| ... | ... | ... | |

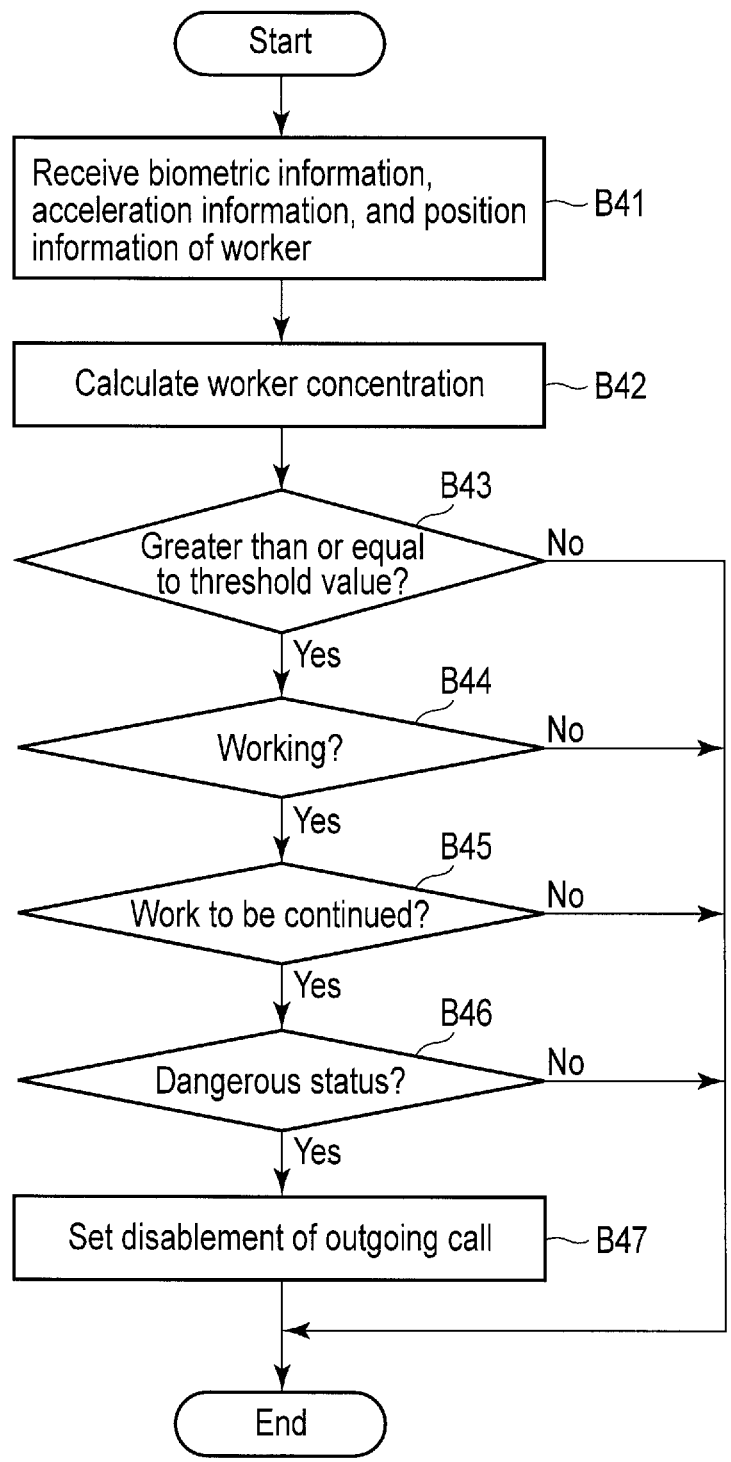
F I G. 19

INFORMATION PROCESSING APPARATUS FOR DETERMINING USER ATTENTION LEVELS USING BIOMETRIC ANALYSIS

CROSS-REFERENCE TO RELATED APPLICATIONS

This application is based upon and claims the benefit of priority from Japanese Patent Application No. 2015-174467, filed Sep. 4, 2015, the entire contents of which are incorporated herein by reference.

FIELD

Embodiments described herein relate generally to an electronic apparatus and a method.

BACKGROUND

Recently, for example, a wearable terminal worn and used by a user has been put into practice. As the wearable terminal, for example, an eyeglasses-type wearable terminal, a wristband-type wearable terminal, etc. are known.

Since this wearable terminal can be used in a hands-free state, for example, attachment of a user (hereinafter called a worker) working in a predetermined range such as a factory has been reviewed.

Incidentally, a manager who manages workers is positioned in the factory where the workers work. The manager gives workers instructions for assignment of works, confirmation and change of works, etc., but, for example, if the factory area is large and the number of workers is great, the instructions are often given by call (speech communication).

For example, however, if a worker receives an incoming call (call arrival) from the manager while concentrating on the work, etc., the worker needs to suspend the work in order to respond to the incoming call. This matter deteriorates the worker's concentration and consequently lowers the work efficiency. A system of recognizing the worker's status as to whether the worker concentrates or not is therefore desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 12 is a table showing an example of a data structure of worker information stored in worker information storage.

FIG. 13 is a table showing an example of a data structure of process information stored in process information storage.

FIG. 19 is a flowchart showing a processing procedure of status estimation processing.

DETAILED DESCRIPTION

Various embodiments will be described hereinafter with reference to the accompanying drawings.

In general, according to one embodiment, a method includes receiving biometric information about a living body of a user wearing an eyeglasses-type wearable terminal and working in a predetermined range, from the eyeglasses-type wearable terminal, and estimating that the user is concentrating, based on the received biometric information.

First Embodiment

Figure 1:
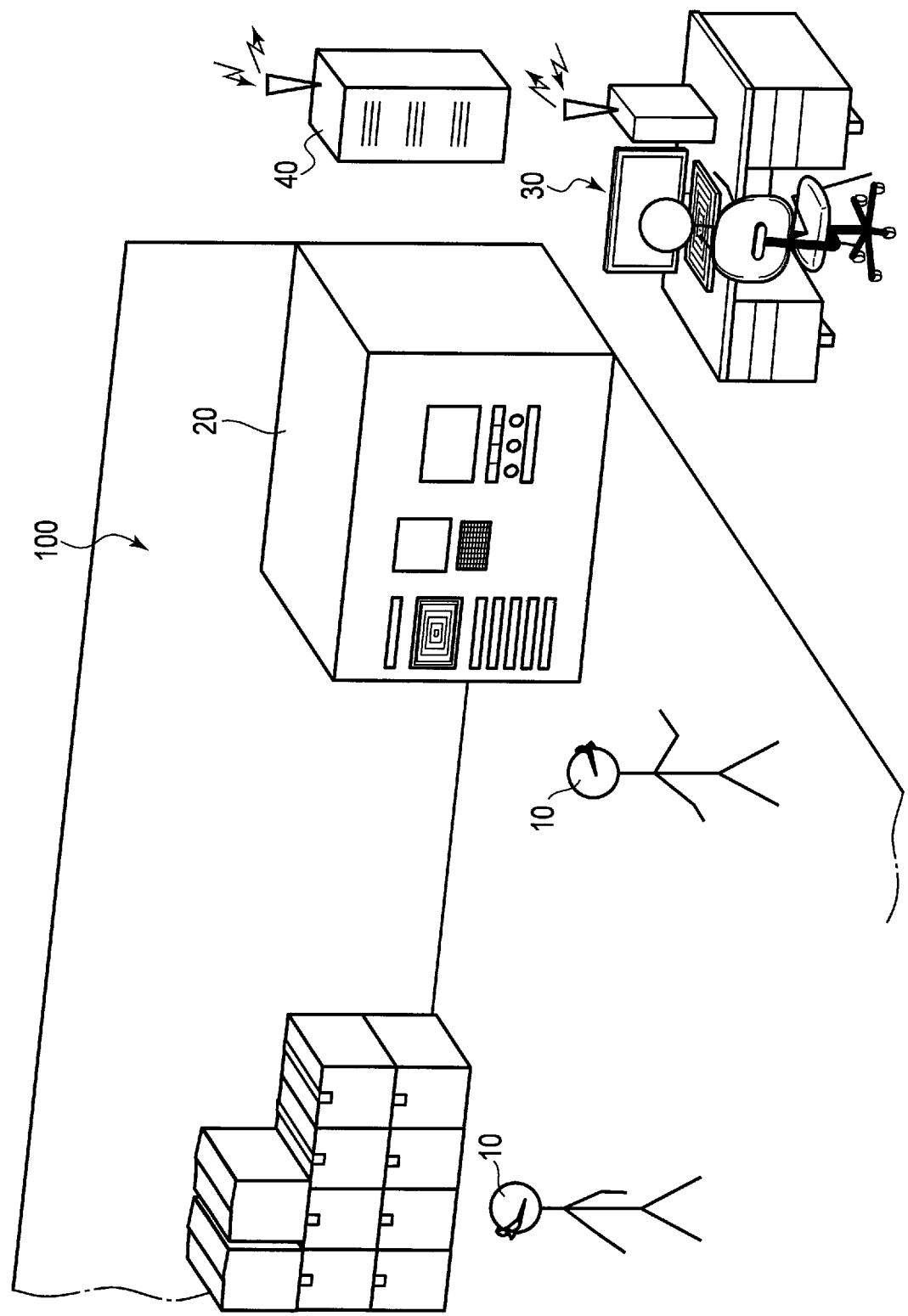
FIG. 1 is an illustration for explanation of an example of an environment using a management system of a first embodiment.

A first embodiment will be described. FIG. 1 is an illustration for explanation of an example of an environment in which a management system including a management server of the present embodiment is used.

The management system of the present embodiment is used to manage, for example, a worker working in a predetermined range (for example, a factory site) and a device (for example, a manufacturing device for manufacturing a product) installed in the range.

As shown in FIG. 1, the management system includes a worker terminal 10, a manufacturing device 20, a manager terminal 30 and a management server 40.

The worker terminal 10 is, for example, a terminal device (user terminal) used by a worker (user) working in a work area 100 such as a factory site. The worker terminal 10 implies, for example, an eyeglasses-type wearable terminal which the worker can wear and use. The worker terminal 10 is hereinafter explained as an eyeglasses-type wearable terminal.

As shown in FIG. 1, a worker wears and uses one worker terminal 10. For this reason, the management system includes the number of worker terminals 10 corresponding to the number of workers.

The manufacturing device 20 is, for example, a device capable of manufacturing a product by a worker operation. The manufacturing device 20 is assumed to be, for example, a device which automatically manufactures a product by allowing the worker to set members necessary for the manufacturing and complete the preparation. In the present embodiment, the management system includes the manufacturing device 20, but may include, for example, any other devices installed in the work area 100.

One manufacturing device 20 is shown in FIG. 1 for convenience, but a plurality of manufacturing devices 20 are assumed to be installed in the work area 100.

The manager terminal 30 is a terminal device used by a manager who manages the worker and the manufacturing device 20 in the work area 100. The manager terminal 30 implies, for example, a personal computer, etc., installed in a monitoring chamber, etc., outside the work area 100. For example, if the manager walks around in the work area 100 to monitor the worker's working condition, the operation condition of the manufacturing device 20, etc., the eyeglasses-type wearable terminal similar to the worker terminal 10 may be used as the manager terminal 30.

The management server 40 is a server device (electronic apparatus) which manages a product manufacturing process executed by the manufacturing device 20 installed in the work area 100. The management server 40 has a function of estimating the status of the worker working in the work area 100, and details of the function will be explained later.

A plurality of access points are assumed to be provided in the work area 100 to allow the worker terminal 10 to execute wireless communication, but are not shown in FIG. 1.

Figure 2:
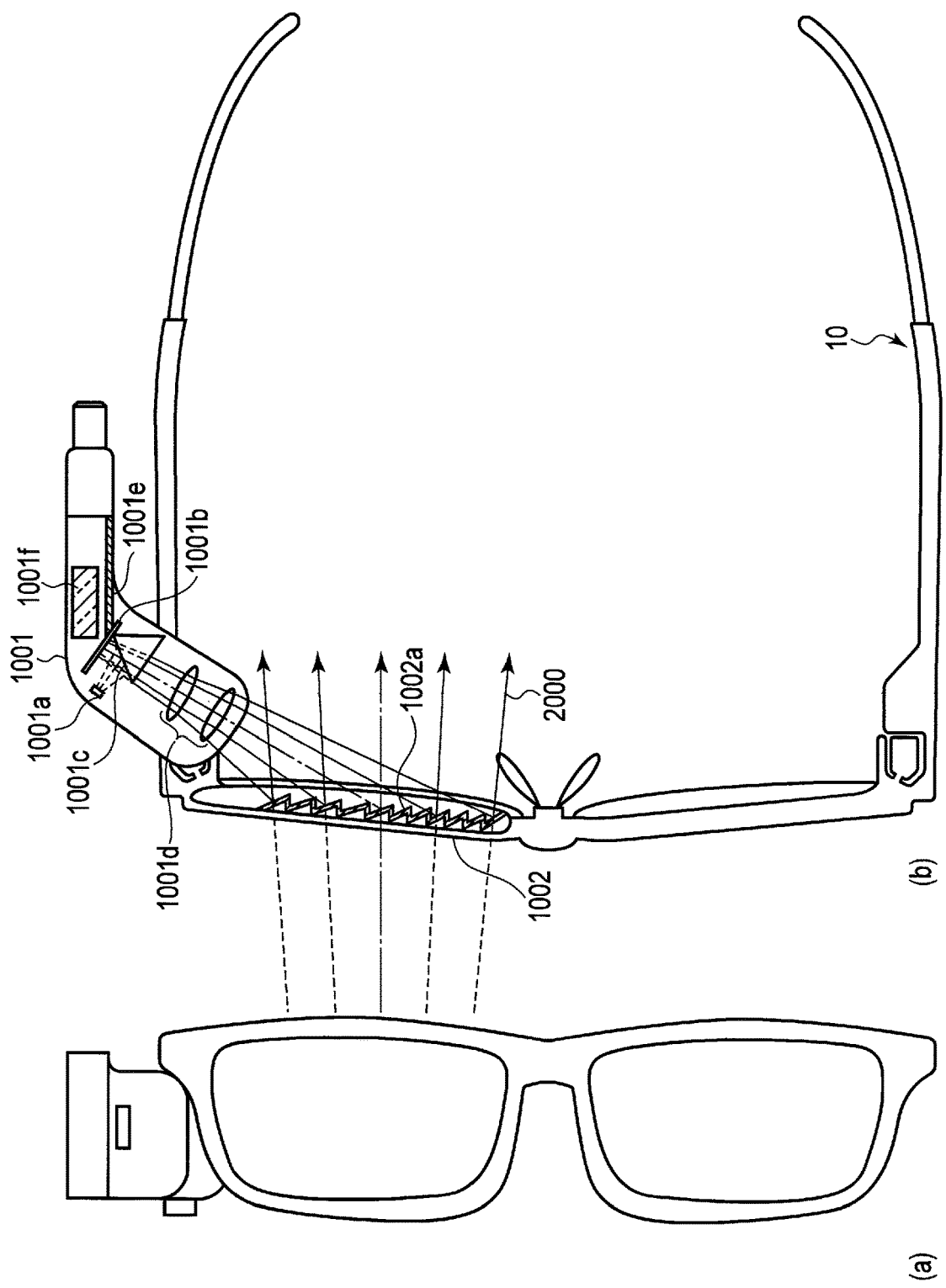
FIG. 2 is a schematic illustration showing an example of a worker terminal worn and used by a worker.
Figure 3:
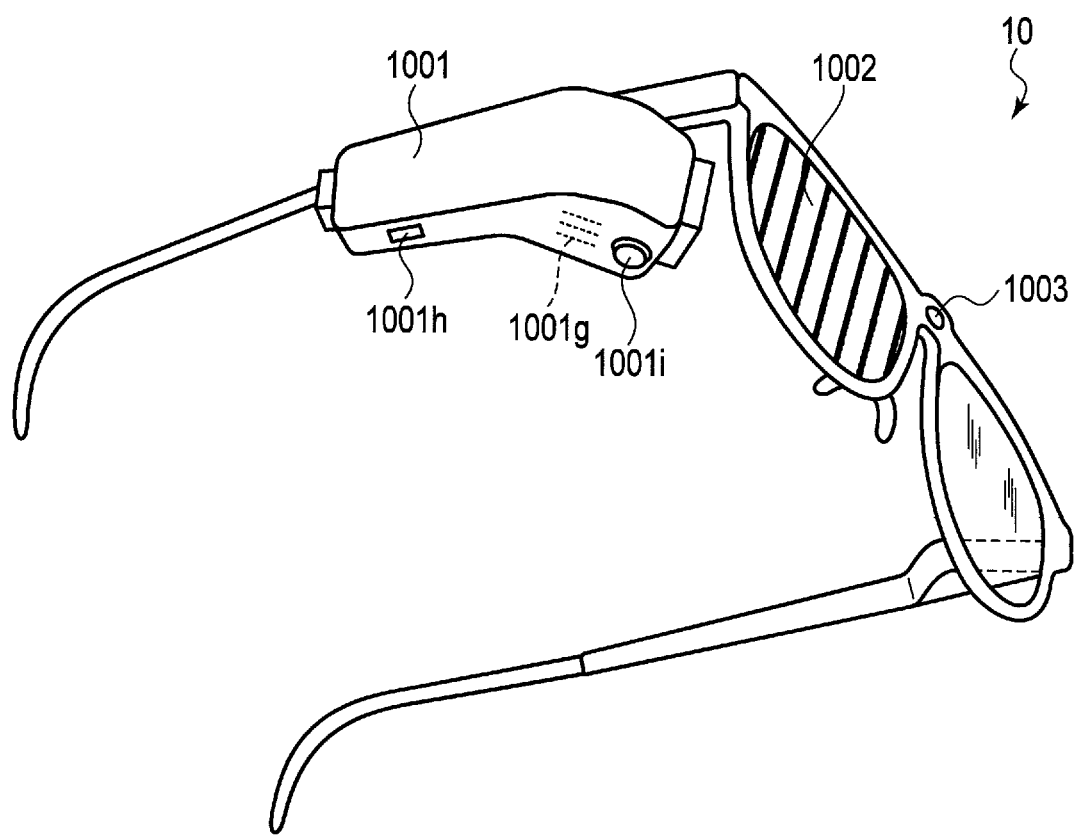
FIG. 3 is a schematic illustration showing an example of the worker terminal worn and used by a worker.

Each of FIG. 2 and FIG. 3 is a schematic illustration showing an example of the worker terminal (eyeglasses-type wearable terminal) worn and used by the worker.

The worker terminal 10 comprises a light projection unit 1001, a lens-integrated screen (display) 1002, etc.

The light projection unit 1001 includes a light source module 1001a, an additional image display module 1001b, a half-mirror module 1001c, a lens group 1001d, a driver 1001e, a built-in battery 1001f, etc. In the light projection unit 1001, an image and information displayed by the additional image display module 1001b are illuminated with light 2000 emitted from the light source module 1001a, and its reflected light (projected image) is output (emitted). The light 2000 emitted from the light source module 1001a is non-parallel light having divergence (divergent light).

The light source module 1001a should preferably be a dimming-type white LED light source including a plurality of, for example, three light emitting diodes (LED) in which their output light quantities can be varied independently. In this case, three LEDs are assumed to be different in light color. If such a dimming-type white LED light source is used, a display color which can easily be seen to the worker can be provided (output) by changing the light color in accordance with the use environment that the worker terminal 10 is used in a clean room in which illumination mainly based on, for example, an orange color is often used.

The additional image display module 1001b is, for example, a reflection-type liquid crystal display (LCD) module and displays a predetermined additional image. The predetermined additional image includes, for example, various messages, marks, etc.

The light 2000 emitted from the light source module 1001a is reflected on the half-mirror module 1001c to illuminate the additional image displayed on the additional image display module 1001b, and is reflected again as image light corresponding to the additional image.

The light (additional image light) 2000 reflected at the additional image display module 1001b passes through the half-mirror module 1001c, is given a predetermined image size by the lens group 1001d, and reaches the lens-integrated screen 1002.

The driver 1001e controls the light emitted from the light source module 1001a in response to the additional image displayed on the additional image display module 1001b.

The built-in power supply 1001f is implemented by, for example, a button battery or the like. The worker terminal 10 operates with the power supplied from the built-in power supply 1001f.

The lens-integrated screen 1002 includes a Fresnel lens type half-mirror portion 1002a.

The light 2000 reaching the lens-integrated screen 1002 as explained above is reflected in part on the Fresnel lens type half-mirror portion 1002a to form a virtual image corresponding to the additional image displayed on the additional image display module 1001b.

As shown in FIG. 3, the worker terminal 10 includes a speaker 1001g, a (slide) switch 1001h, a (rotary) knob 1001i, etc., at a predetermined position (for example, a bottom surface portion) of the light projection unit 1001. The switch 1001h is provided to adjust, for example, luminance of the light 2000 emitted from the light projection unit 1001. The knob 1001i is provided to adjust, for example, an angle of projection of the light 2000 emitted from the light projection unit 1001. By operating each of the switch 1001h and the knob 1001i, the worker (user of the eyeglasses-type wearable terminal) can adjust the luminance and the angle of projection while visually recognizing the additional image projected by the lens-integrated screen 1002. In other words, display luminance and color tone of the additional image suitable for the worker's taste can be provided by providing the switch 1001h. In addition, the additional image can be displayed at an optimum position in accordance with the shape and size of the head of the worker, by providing the knob 1001i.

Furthermore, a camera 1003 for taking an image of, for example, a periphery of the worker terminal 10 is provided on the worker terminal 10. The camera 1003, which is provided at, for example, a position shown in FIG. 3, takes an image in a line-of-sight direction of the worker wearing the worker terminal 10.

Figure 4:
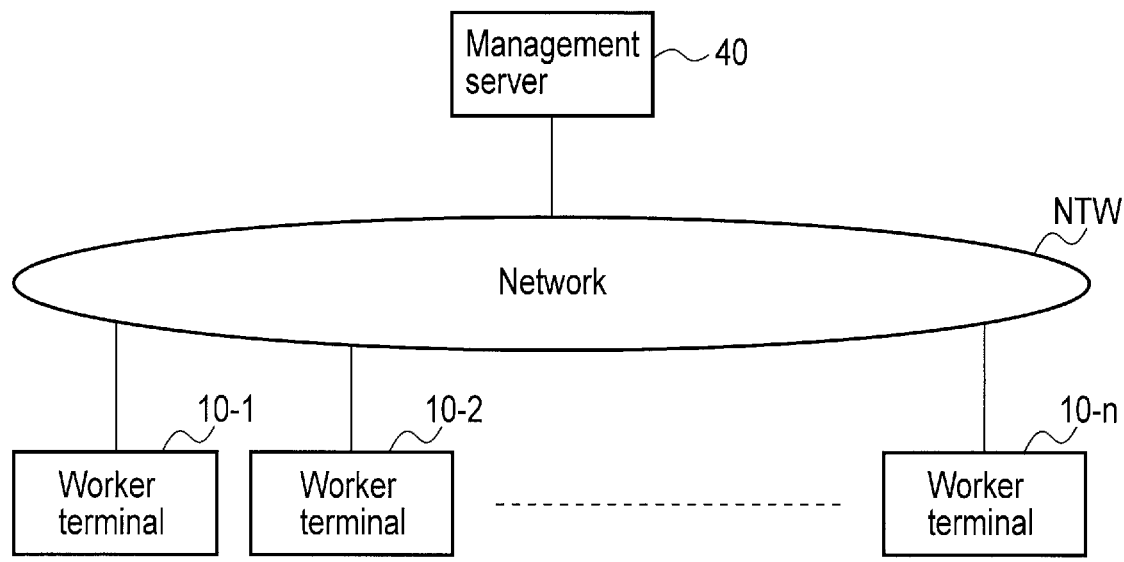
FIG. 4 is a diagram showing an example of a network configuration of a management system.

FIG. 4 shows a network configuration of the management system. An example in which the management system includes a plurality of worker terminals 10 is illustrated in FIG. 4. In FIG. 4, the plurality of worker terminals 10 include worker terminals 10-1, 10-2, . . . , 10-n (where n is an integer greater than or equal to, for example, three).

As shown in FIG. 4, the plurality of worker terminals 10 are connected to the management server 40 via a network NTW so as to enable communication, in the management system of the present embodiment. The management server 40 can thereby receive (acquire) various types of information to be explained later from the plurality of worker terminals 10.

Figure 5:
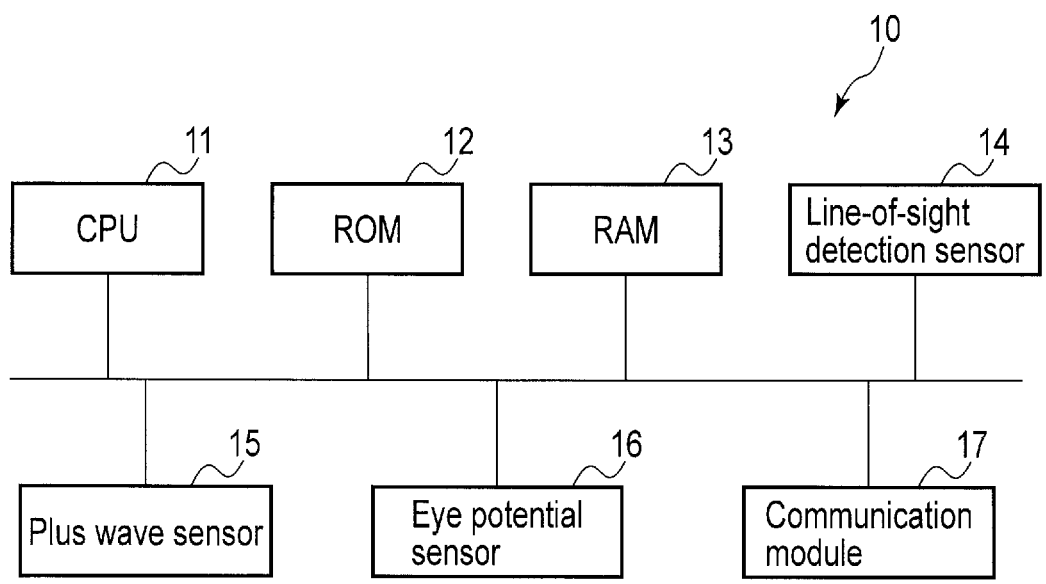
FIG. 5 is a diagram showing an example of a system configuration of the worker terminal.

FIG. 5 shows an example of a system configuration of the worker terminal 10. As shown in FIG. 5, the worker terminal 10 includes a CPU 11, a ROM 12, a RAM 13, a line-of-sight detection sensor 14, a pulse wave sensor 15, an eye potential sensor 16, a communication module 17, etc. The components explained with reference to FIG. 2, FIG. 3, etc., are not shown in FIG. 5.

The CPU 11 is a hardware processor (processing circuit) which controls operations of the components in the worker terminal 10. The CPU 11 executes various types of software (programs for the worker terminal 10) loaded from the ROM 12 which is a nonvolatile memory on the RAM (main memory) 13.

In the present embodiment, the line-of-sight detection sensor 14, the pulse wave sensor 15, and the eye potential sensor 16 are used to obtain biometric information about a living body of the worker wearing the worker terminal 10.

The line-of-sight detection sensor 14 is, for example, a sensor capable of detecting the line of sight (direction) of the user. A camera or the like capable of photographing, for example, eye movement of the user can be used as the line-of-sight detection sensor 14. The camera used as the line-of-sight detection sensor 14 implies, for example, an infrared camera having a function of photographing infrared rays, a visible light camera having a function of photographing visible light, etc.

If an infrared camera is used as the line-of-sight detection sensor 14, the line-of-sight detection sensor 14 takes an image of, for example, the infrared light emitted from an infrared LED, in a state of illuminating a face (eye) of the user. In this case, for example, by using a position on the cornea (corneal reflex), of the reflected light generated by the infrared light on the image captured by the line-of-sight detection sensor 14 as a reference point and using a pupil on the image as a moving point, the line-of-sight detection sensor 14 can detect the line-of-sight direction of the user, based on the position of the moving point relative to the reference point.

In a case where a visible light camera is used as the line-of-sight detection sensor 14, for example, if an inner corner of eye on the image captured by the line-of-sight detection sensor 14 is used as a reference point and an iris is used as a moving point, the line-of-sight detection sensor 14 can detect the line-of-sight direction of the user, based on the position of the moving point relative to the reference point.

By thus using the line-of-sight detection sensor 14, the worker terminal 10 can obtain the variation amount of the line-of-sight direction of the worker, etc., based on the line-of-sight direction of the worker continuously detected by the line-of-sight detection sensor 14.

The pulse wave sensor 15 is, for example, a sensor capable of measuring a pulse wave on a body surface of the worker, in a status in which the worker wears the worker terminal 10.

By thus using the pulse wave sensor 14, the worker terminal 10 can obtain the pulse rate of the worker, etc., based on the pulse wave of the worker continuously detected by the pulse wave sensor 15. It should be noted that, for example, variation in the pulse rate, an index such as LF/HF, etc. may be obtained as the pulse rate, etc., of the worker.

The eye potential sensor 16 is a sensor capable of measuring the eye potential of the worker by using, for example, the eye potential sensing technology. The eye potential sensor 16 measures a potential difference (voltage variation) generated between a cornea side and a retina side of an eyeball, which is varied by the movement of the eyeball, with a plurality of electrodes attached to the worker terminal 10 (a periphery of the eye).

By thus using the eye potential sensor 16, the worker terminal 10 can obtain the number of times of blink of the worker, etc., based on the eye potential of the worker continuously detected by the eye potential sensor 16.

The communication module 17 is a module which executes wireless communication with the management server 40, etc., via the network NTW. The communication module 17 executes wireless communication such as wireless LAN via, for example, an access point provided in the work area 100.

The communication module 17 can thereby transmit biometric information (hereinafter called biometric information of the worker) including the variation amount of the line-of-sight direction, the pulse rate, and the number of times of blink, of the worker, to the management server 40.

The communication module 17 may execute wireless communication conforming to standards such as Wi-Fi®, WiMAX®, 3G mobile communication, 4G mobile communication, and Bluetooth®.

The worker terminal 10 further includes a microphone, etc., which are not shown in FIG. 5, and has a speech communication function implemented by a technology called Voice over Internet Protocol (VoIP), etc. The worker can execute speech communication with the manager via, for example, the worker terminal 10 by the speech communication function.

The worker terminal 10 may further includes, for example, an LED lamp (not shown), etc., to notify the worker of various alerts.

Figure 6:
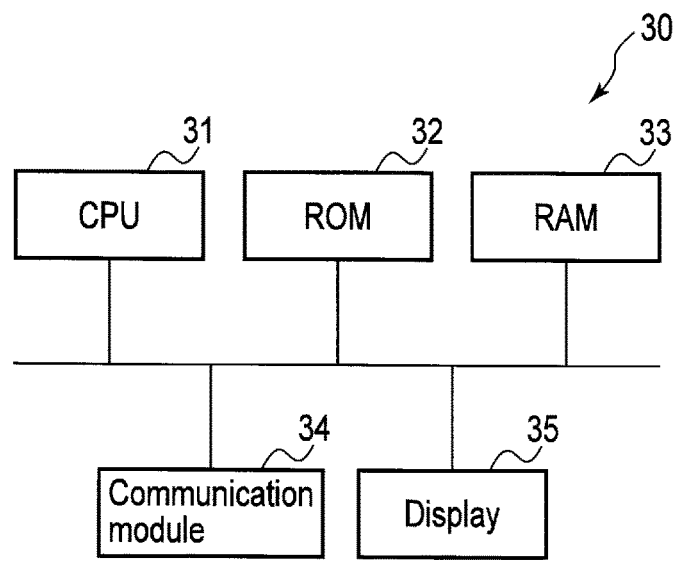
FIG. 6 is a diagram showing an example of a system configuration of a manager terminal.

FIG. 6 shows an example of a system configuration of the manager terminal 30. As shown in FIG. 6, the manager terminal 30 includes a CPU 31, a ROM 32, a RAM 33, a communication module 34, a display 35, etc.

The CPU 31 is a hardware processor (processing circuit) which controls operations of the components in the manager terminal 30. The CPU 31 executes various types of software (programs for the manager terminal 30) loaded from the ROM 32 which is a nonvolatile memory on the RAM (main memory) 33.

The communication module 34 is, for example, a module which executes wireless communication with the management server 40, etc.

The display 35 is a display device which displays various types of information. The display 35 implies, for example, a liquid crystal display (LCD).

In addition, the manager terminal 30 is assumed to include, for example, a speech communication function which enables the manager to execute speech communication with the worker, similarly to the worker terminal 10, but the function is not shown in FIG. 6.

Figure 7:
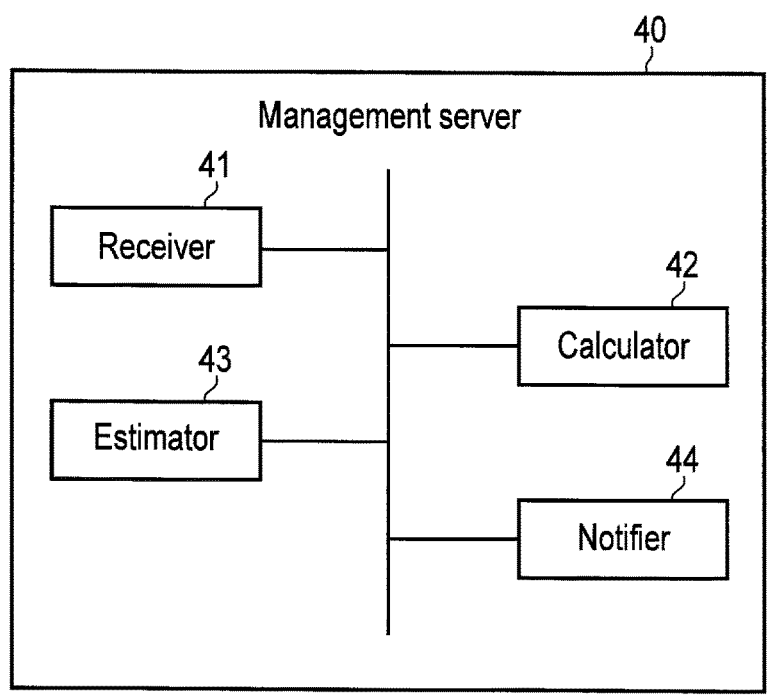
FIG. 7 is a block diagram showing an example of a functional configuration of a management server.

FIG. 7 is a block diagram showing a functional configuration of the management server 40. In the present embodiment, the management server 40 has a function of estimating the worker status, based on the biometric information of the worker. Functional modules about the function of estimating the worker status will be mainly explained.

As shown in FIG. 7, the management server 40 includes a receiver 41, a calculator 42, an estimator 43, and a notifier 44.

In the present embodiment, some or all the modules 41 to 44 are realized by causing a computer such as a CPU (hardware processor not shown) provided in the management server 40 to execute a program (program for the management server 40), i.e., by software. Some or all the modules 41 to 44 may be implemented by hardware such as an integrated circuit (IC), etc., or implemented as a combined configuration of software and hardware. The program executed by the computer may be installed in, for example, an arbitrary storage device (memory) provided in the management server 40.

The receiver 41 receives the biometric information of the worker transmitted from each worker terminal 10.

The calculator 42 calculates concentration indicating a degree to which the worker concentrates (hereinafter called worker concentration), based on the biometric information received by the receiver 41.

The estimator 43 estimates that the worker is concentrating, based on the worker concentration calculated by the calculator 42.

The notifier 44 outputs (transmits), for example, a notification including information that the outgoing call to the worker terminal 10 made by the above-explained speech communication function is disabled, if the estimator 43 estimates that the worker is concentrating.

Next, a procedure of processing of estimating the status of the worker working in the work area 100, by the management server 40 of the present embodiment, will be explained with reference to a flowchart of FIG. 8.

Figure 8:
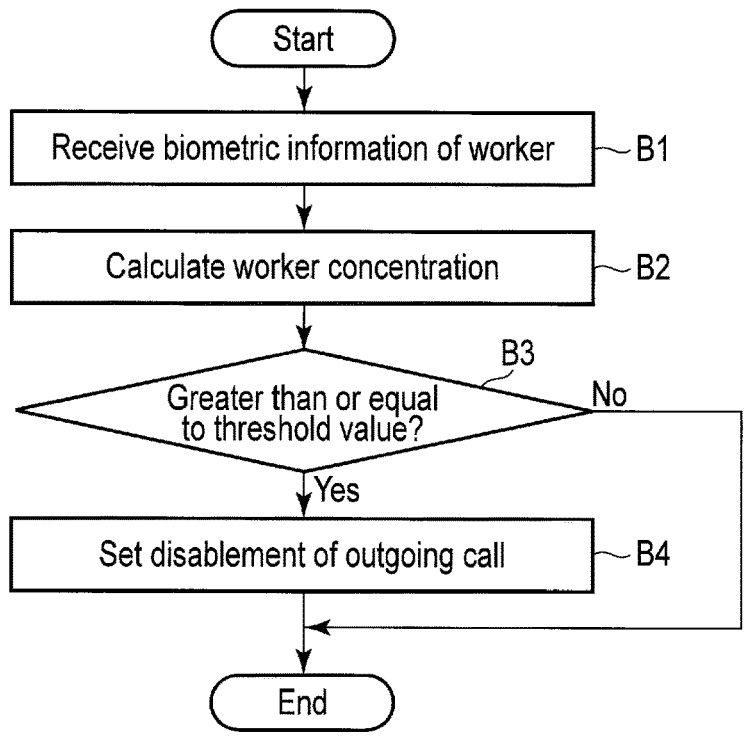
FIG. 8 is a flowchart showing a processing procedure of status estimation processing.

The processing shown in FIG. 8 is executed for each of worker terminals 10 worn by the respective workers working in the work area 100, and the worker terminal 10 which is a target of the processing is called a target worker terminal 10 for convenience in the following explanations. Similarly, the worker wearing the target worker terminal 10 is called a target worker for convenience.

First, the target worker terminal 10 worn by the target worker working in the work area 100 periodically transmits, for example, the variation amount of the line-of-sight direction, the pulse rate and the number of times of blink, of the target worker, to the management server 40, together with the worker ID to identify the target worker, by continuously driving the line-of-sight detection sensor 14, the pulse wave sensor 15 and the eye potential sensor 16.

The receiver 41 in the management server 40 thereby receives the biometric information of the target worker from the target worker terminal 10 (block B1).

When the processing of block B1 is executed, the calculator 42 calculates the target worker concentration, based on the biometric information of the target worker received in block B1. In this case, for example, the calculator 42 calculates the concentration by comparing the variation amount of the line-of-sight direction, the pulse rate and the number of times of blink, included in the biometric information of the target worker with respective reference values (for example, the variation amount of the line-of-sight direction, the pulse rate and the number of times of blink, of the target worker at the normal time), and by digitizing a tendency in which the target worker is concentrating. More specifically, for example, if the variation amount of the line-of-sight direction of the target worker is extremely small, the variation in pulse rate of the target worker is small or the number of times of blink of the target worker is extremely small, as compared with the normal time, it is estimated that the target worker is not concentrating, and a low concentration is calculated. The concentration of the target worker may be calculated by applying the variation amount of the line-of-sight direction, the pulse rate and the number of times of blink, included in the biometric information of the target worker, to a prepared function, etc.

Next, the estimator 43 determines whether the concentration of the target worker calculated in block B2 is greater than or equal to a predetermined value (hereinafter called a threshold value) or not (block B3).

If the concentration of the target worker is determined to be greater than or equal to the threshold value (YES in block B3), the estimator 43 estimates that the target worker is concentrating.

If the target worker is thus estimated to be concentrating, the estimator 43 sets the outgoing call to the target worker terminal 10 to be disabled (hereinafter simply called disablement of outgoing call) in the management server 40 (block B4).

If the concentration of the target worker is determined not to be greater than or equal to the threshold value (NO in block B3), it is estimated that the target worker is not concentrating (i.e., the worker is in a status of non-concentrating), and the processing is ended.

The disablement of outgoing call to each worker terminal 10 can be set in the management server 40 in accordance with each status of the worker working in the work area 100 (i.e., whether the worker is concentrating or not) by executing the processing shown in FIG. 8 for each worker terminal 10. The processing shown in FIG. 8 is periodically executed every time the management server 40 receives the biometric information of each worker as explained above. For example, if it is estimated that the target worker is not concentrating, in the processing shown in FIG. 8 after setting the disablement of outgoing call to the target worker terminal 10, the setting of the disablement of outgoing call to the target worker terminal 10 is canceled, but this process is not shown in FIG. 8.

The processing shown in FIG. 8 is executed by the management server 40 but, a part or all of the processing shown in FIG. 8 may be executed by the worker terminal 10. In other words, it may be estimated at the worker terminal 10 that the worker is concentrating.

If the disablement of outgoing call to the worker terminal 10 is thus set, the management server 40 executes processing for disabling the outgoing call to the worker terminal 10 (hereinafter called disablement processing). An example of the disablement processing will be hereinafter explained with reference to a flowchart of FIG. 9.

First, the manager can execute, for example, instructions of work assignment, confirmation and change of work contents, etc., for each worker, by speech communication (telephone), by using (the speech communication function of) the worker terminal 10 and the manager terminal 30. In this case, the manager executes an operation for the outgoing call to (the worker terminal 10 worn by) the worker who is the target of instruction (hereinafter called an outgoing call operation), on the manager terminal 30. The outgoing call operation implies, for example, an operation of displaying a screen for the outgoing call to the worker on the manager terminal 30, an operation of pressing a button for the outgoing call to the worker on the screen, etc. The worker who the manager is to make an outgoing call to by the outgoing call operation (i.e., a worker of outgoing call destination) is hereinafter called a target worker in the explanations of FIG. 9. In addition, the worker terminal 10 worn by the target worker is called target worker terminal 10.

If the outgoing call operation to the manager terminal 30 is thus executed, the manager terminal 30 transmits an inquiry to the management server 40. The inquiry includes the worker ID to identify the target worker.

The receiver 41 in the management server 40 receives the inquiry transmitted by the manager terminal 30 (block B11).

Next, the notifier 44 determines whether the disablement of outgoing call to the target worker terminal 10 is set in the management server 40 or not, based on the worker ID included in the inquiry received in block B11 (block B12).

If it is determined that the disablement of outgoing call to the target worker terminal 10 is set (NO in block B12), the notifier 44 outputs a notification including information that the outgoing call to the target worker terminal 10 is disabled, to the manager terminal 30, as a response to the inquiry received in block B11 (block B13).

In this case, the notification output by the notifier 44 is displayed on the display 35 of the manager terminal 30. More specifically, a message or the like indicating that the outgoing call to the target worker should not be made (or the target worker cannot respond to the incoming call), is displayed on the display 35 of the manager terminal 30.

If such a message is displayed on the display 35 of the manager terminal 30, it is preferable that the manager cancel the outgoing call to the target worker and execute the outgoing call operation again after, for example, a predetermined time has elapsed.

As explained above, if the processing in block B13 is executed, the outgoing call made by the manager is canceled, and the notifier 44 outputs to the worker terminal 10 a notification including information that the outgoing call has been canceled but the outgoing call operation has been executed by the manager (i.e., the outgoing call operation has been executed at the manager terminal 30) (block B14).

In this case, the notification output by the notifier 44 is displayed on the display (lens-integrated screen 1002) of the worker terminal 10. More specifically, a message, a mark or the like indicating that the outgoing call operation has been executed by the manager (i.e., the manger has been willing to make the outgoing call to the target worker) is displayed on the display of the worker terminal 10. The message, the mark or the like is displayed in a part of the area, etc., of the lens-integrated screen 1002 in order to secure the sight of the target worker wearing the worker terminal 10.

In the present embodiment, if the target worker is concentrating (i.e., the disablement of outgoing call to the target worker terminal 10 is set), the manager is promoted to cancel the outgoing call to the target worker, from the viewpoint that, for example, if the target worker who is concentrating responds to the incoming call from the manager, the concentration of the target worker is lowered (lost).

In contrast, even if the message or the like is displayed on the display of the worker terminal 10 while the target worker is concentrating, the concentration of the target worker may be lowered. For this reason, for example, such a message or the like may be displayed if the target worker is not in a status of concentrating (i.e., when the setting of the disablement of outgoing call to the target worker is canceled).

In addition, the worker may be notified of the information that the outgoing call operation has been executed by the manager, by turning on the LED lamp mounted at the worker terminal 10, etc.

More specifically, for example, the LED lamp may be turned on if the target worker is concentrating (i.e., when the disablement of outgoing call to the target worker terminal 10 is set), and the message may be displayed on the display if the target worker is not concentrating (i.e., after the setting of the disablement of outgoing call to the target worker terminal 10 is canceled).

The notification including the information that the outgoing call operation has been executed by the manager is output to the worker terminal 10 but, even if the other various notifications (alert notification, etc.) are also output to the worker terminal 10, an output destination (display or LED lamp) of the notification may be switched based on whether the worker is concentrating or not.

In the present embodiment, if the target worker is concentrating, cancellation of the outgoing call made by the manager is promoted but, conversely, the manager may make the outgoing call to the target worker. In this case, in order to prevent the concentration of the target worker from being lowered (lost), for example, a ringing tone (incoming tone) at the target worker terminal 10 may be set not to be output (i.e., a sound may be set not to be output) when the disablement of outgoing call to the target worker terminal 10 is set. In such a configuration, since the target worker often does not recognize the incoming call, an incoming call history at the target worker terminal 10 may be displayed on the display of the worker terminal 10 when, for example, the setting of the disablement of outgoing call to the worker terminal 10 is canceled.

Furthermore, if the disablement of outgoing call to the target worker terminal 10 is set, an incoming call may be forcefully rejected at the target worker terminal 10 under control of, for example, the management server 40.

In the present embodiment, as explained above, the biometric information about the living body of the worker (user) working in the work area 100 while wearing the worker terminal (eyeglasses-type wearable terminal) 10 is received from the worker terminal 10, and the worker is estimated to be concentrating, based on the received biometric information. More specifically, for example, a concentration which indicates a degree to which the worker is concentrating is calculated based on the biometric information, and it is estimated that the worker is concentrating if it is determined that the concentration is greater than or equal to the threshold value.

In the present embodiment having such a configuration, since the manager does not need to confirm, for example, the status of each worker, burden on the manager can be reduced.

In addition, in the present embodiment, if the worker is estimated to be concentrating, the disablement of outgoing call to the worker terminal 10 is set. In the present embodiment having such a configuration, if the worker is concentrating (concentrating on the work), for example, lowering the concentration (losing the concentration) by the incoming call from the manager can be prevented, and the work efficiency of the worker, the manufacturing efficiency of the manufacturing device 20, etc., can be thereby enhanced.

If the disablement of outgoing call to the worker terminal 10 is set, the notification including information that the outgoing call to the worker terminal 10 is disabled is output to the manager terminal 30, when the operation for the outgoing call to the worker terminal 10 is executed at the manager terminal 30. The manager can therefore cancel the outgoing call to the worker concentrating on the work. The notification including the information that the outgoing call to the worker terminal 10 is disabled may be output to the manager terminal 30 when, for example, the disablement of outgoing call to the worker terminal 10 is set.

In the present embodiment, the notification including the information that the outgoing call operation has been executed to the manager terminal 30 (i.e., the manager has been willing to make an outgoing call) is output to the worker terminal 10. In such a configuration, for example, since the worker can make an outgoing call to (i.e., call) the manager after ending the work, the manager can efficiently give an instruction to (i.e., establish communication with) the worker.

If the concentrating status of the worker becomes the non-concentrating status (i.e., if the setting of the disablement of outgoing call to the worker terminal 10 is canceled), the manager may be promoted to make the outgoing call to the worker, by outputting the notification to the manager terminal 30.

Furthermore, if the worker terminal 10 includes a plurality of display devices such as a display and an LED lamp, various notifications can be output to the LED lamp (first display device) if the worker is estimated to be concentrating, and various notifications can be output to the display (second display device) if it is not estimated that the worker is concentrating. In such a configuration, if the worker is concentrating, the notifications can be displayed in a manner which does not lower the worker's concentration.

The biometric information includes at least one of the variation amount of the line-of-sight direction of the worker obtained by the line-of-sight detection sensor 14, the pulse rate of the worker obtained by the pulse wave sensor 15, and the number of times of blink of the worker obtained by the eye potential sensor 16 in the worker terminal 10. In other words, in the present embodiment, the worker terminal 10 includes the line-of-sight detection sensor 14, the pulse wave sensor 15, and the eye potential sensor 16, but the worker terminal 10 may includes at least one of the sensors 14 to 16.

In the present embodiment, the worker can execute the work in a hands-free style by using the eyeglasses-type wearable terminal as the worker terminal 10. On the other hand, the worker terminal 10 of the present embodiment needs only to obtain the biometric information (for example, the pulse rate, etc.) of the worker necessary to estimate that the worker is concentrating, and provide (transmit) the biometric information to the management server 40. Therefore, the worker terminal 10 may be, for example, a wearable device of the other shapes such as a wristband type or a mobile device such as a smartphone.

If the worker wearing the worker terminal (eyeglasses-type wearable terminal) 10 holds a mobile device such as a smartphone, for example, the worker terminal 10 and the smartphone can also be configured to link with each other. For example, if the worker terminal 10 does not include a speech communication function, speech communication between the worker and the manager may be established by using the speech communication function incorporated in the smartphone. In this case, if the worker terminal 10 and the smartphone are connected by, for example, Bluetooth® so as to establish communication with each other, the worker can establish speech communication with the manager in a hands-free style, similarly to the case where the worker terminal 10 includes a speech communication function.

Furthermore, if the disablement of outgoing call to the worker terminal 10 is set in a configuration that the worker terminal 10 and a smartphone are linked with each other, control of setting the smartphone held by the worker wearing the worker terminal 10, in a silent mode, may be executed under control of, for example, the management server 40. In this case, if the setting of the disablement of outgoing call to the worker terminal 10 is canceled, setting of the silent mode at the smartphone may be canceled.

In addition, for example, by transmitting an incoming call history at the smartphone to the worker terminal 10 if the setting of the disablement of outgoing call to the worker terminal 10 is canceled, the incoming call history may be displayed on the display of the worker terminal 10.

Second Embodiment

Next, a second embodiment will be described. Since the environment in which a management system of the present embodiment is used, the network configuration of the management system, etc., are the same as those of the first embodiment, they are not hereinafter explained in detail. Arbitrarily, the present embodiment will be explained hereinafter with reference to FIG. 1 to FIG. 4. In the present embodiment, portions different from the first embodiment will be mainly explained.

In the present embodiment, the management server 40 and each of the manufacturing devices 20 are connected via the network NTW so as to enable communication, but the connection is not shown in FIG. 4. In such a configuration, the management server 40 can receive (acquire) information indicating each status of the manufacturing device 20 (hereinafter called status information of the manufacturing device 20) from the manufacturing device 20. Statuses indicated by the status information include, for example, a status in which a product is being manufactured, a status in which preparation for manufacturing the product is completed, a status in which the preparation for manufacturing the product is not completed, etc. The status information may include, for example, information as to whether the manufacturing device 20 is operated or not, etc.

Figure 10:
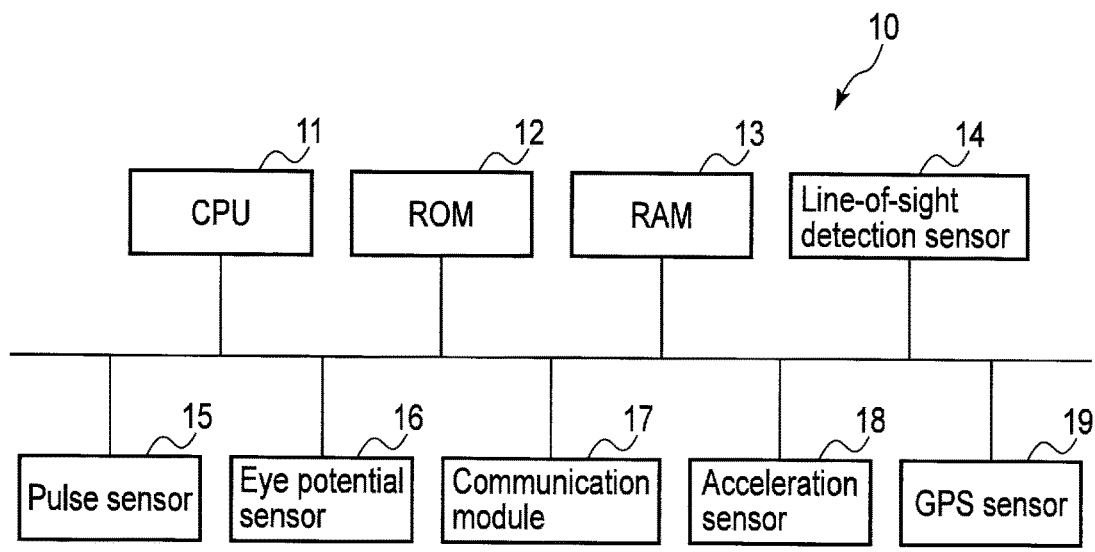
FIG. 10 is a diagram showing an example of a system configuration of a worker terminal of a second embodiment.

FIG. 10 is a diagram showing an example of a system configuration of the worker terminal of the present embodiment. As shown in FIG. 5, the worker terminal 10 includes an acceleration sensor 18 and a global positioning system (GPS) sensor 19, in addition to a CPU 11, a ROM 12, a RAM 13, a line-of-sight detection sensor 14, a pulse wave sensor 15, an eye potential sensor 16, and a communication module 17 which are explained in the above embodiment.

The acceleration sensor 18 is a sensor capable of measuring the acceleration generated on (the worker wearing) the worker terminal 10.

The GPS sensor 19 is a sensor capable of detecting a position of (a worker wearing) the worker terminal 10 by executing communication with a GPS satellite.

In the present embodiment, the communication module 17 transmits to the management server 40 the information indicating the acceleration measured by the acceleration sensor 18 (hereinafter called acceleration information of the worker) and the information indicating the position detected by the GPS sensor 19 (hereinafter called position information of the worker), in addition to the biometric information of the worker as explained in the first embodiment.

Since the system configuration of the manager terminal 30 has been explained in the first embodiment, its detailed explanations are omitted here.

Figure 11:
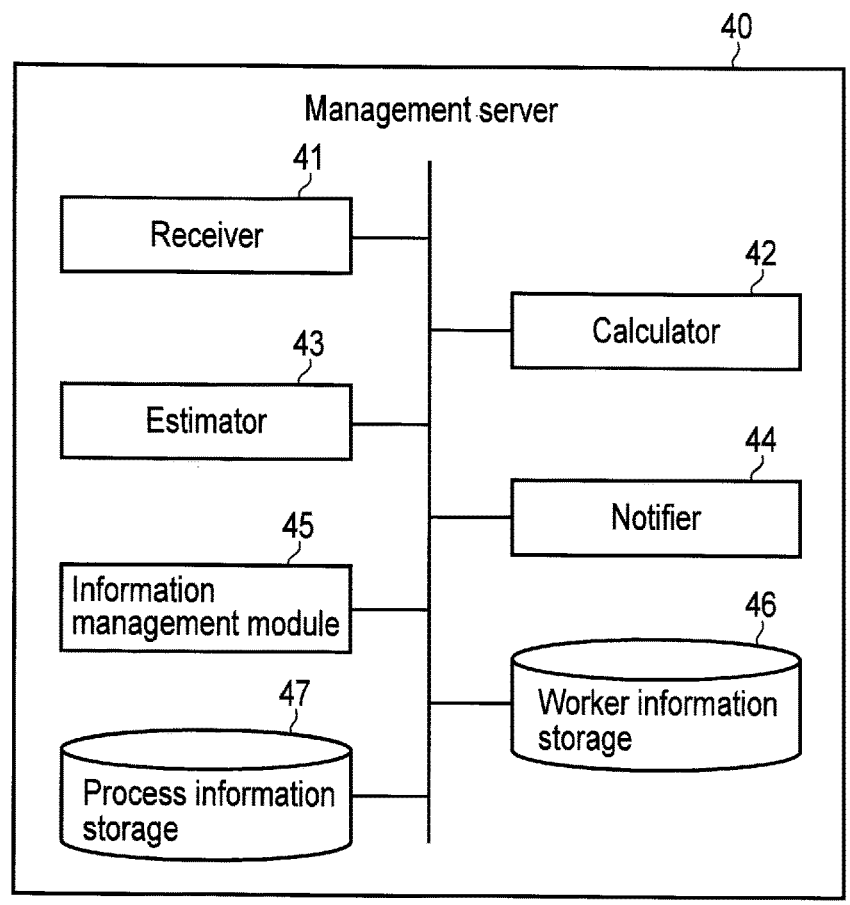
FIG. 11 is a block diagram showing an example of a functional configuration of a management server.

FIG. 11 is block diagram showing a functional configuration of the management server 40 of the present embodiment. As shown in FIG. 7, the management server 40 includes an information management module 45, worker information storage 46 and process information storage 47, in addition to the receiver 41, the calculator 42, the estimator 43, and the notifier 44 as explained in the first embodiment.

In the present embodiment, the receiver 41 receives the acceleration information and the position information of the worker, in addition to the biometric information of the worker transmitted from each worker terminal 10.

The information management module 45 manages various types of information stored in the worker information storage 46 and the process information storage 47.

The worker information storage 46 stores information about the worker working in the work area 100 (hereinafter called worker information).

The process information storage 47 stores information about the product manufacturing process executed by the manufacturing device 20 (hereinafter called process information).

In the present embodiment, the estimator 43 determines (estimates) whether the worker is working in the work area 100 or not, with the acceleration information and the position information received from the worker terminal 10, and the information stored in the worker information storage 46 and the process information storage 47. The estimator 43 sets the disablement of outgoing call to the worker terminal 10, based on the determination result.

The worker information stored in the worker information storage 46 and the process information stored in the process information storage 47 shown in FIG. 11 will be hereinafter explained.

FIG. 12 shows an example of a data structure of the worker information stored in the worker information storage 46. As shown in FIG. 12, the worker information stored in the worker information storage 46 includes position information indicating a position of a worker and the status of the worker in association with a worker ID to identify the worker.

In the example shown in FIG. 12, the worker information storage 46 stores worker information elements 461 to 463.

The worker information element 461 includes position information "Xu1, Yu1" and status "working" in association with worker ID "HO_0001". The worker information element 461 indicates that the position of the worker identified by worker ID "HO_0001" is the position indicated by position information "Xu1, Yu1" and that the worker is executing the work (i.e., working). If the worker is executing the work of operating the manufacturing device 20, the status may include an identifier to identify the manufacturing device 20.

The worker information element 462 includes position information "Xu2, Yu2" and status "moving" in association with worker ID "HO_0002". The worker information element 462 indicates that the position of the worker identified by worker ID "HO_0002" is the position indicated by position information "Xu2, Yu2" and that the worker is executing the movement (i.e., moving).

The worker information element 463 includes position information "Xu3, Yu3" and status "waiting" in association with worker ID "HO_0003". The worker information element 463 indicates that the position of the worker identified by worker ID "HO_0003" is the position indicated by position information "Xu3, Yu3" and that the worker is waiting.

The position information included in the worker information elements 461 to 463 can be periodically updated by receiving the above-explained worker position information from the worker terminal 10. The status included in the worker information elements 461 to 463 can be periodically updated, based on the worker position information and the above-explained status information of the manufacturing device 20. More specifically, for example, if the manufacturing device 20 in close vicinity to the worker position indicated by the position information is in the status of manufacturing the product, the status can be updated to "working (for example, operating the manufacturing device 20)". The manufacturing device 20 in close vicinity to the worker position can be identified (searched) with the position information (hereinafter called position information of the manufacturing device 20) which is preliminarily held in the management server 40 and which indicates the position of the manufacturing device 20. If the worker position indicated by the periodically updated position information moves sequentially, the status can be updated to "moving". Furthermore, if the worker position indicated by the position information is a predetermined position (for example, a standby location), etc., the status can be updated to "waiting".

The status included in the worker information may be updated in accordance with, for example, the worker status specified by the worker at the worker terminal 10.

The worker information elements 461 to 463 alone have been explained with reference to FIG. 12, but the worker information storage 46 stores the worker information about all the workers working in the work area 100. The worker information about the worker has been explained but, for example, if the manager walks around in the work area 100, the position information indicating the manager position (manager information about the manager) may be managed in the management server 40.

FIG. 13 shows an example of a data structure of the process information stored in the process information storage 47. As shown in FIG. 13, the process information stored in the process information storage 47 includes a manufacturing start time, a work name and a status in association with the device ID to identify the manufacturing device 20.

The manufacturing start time indicates a start time of the process of manufacturing the product by the manufacturing device 20 identified by the device ID associated with the manufacturing start time (hereinafter called a manufacturing process of the manufacturing device 20). The work name indicates the work executed by the worker in the manufacturing process of the manufacturing device 20 identified by the device ID associated with the work name. The status indicates the current status of the manufacturing device 20 identified by the device ID associated with the status. The status is assumed to be periodically updated, based on the status information of the manufacturing device 20 received from each manufacturing device 20.

In the example shown in FIG. 13, the process information storage 47 stores process information elements 471 to 474.

The process information element 471 includes manufacturing start time "10:00", work name "work A" and status "manufacturing" in association with device ID "M_0001". The process information element 471 indicates that the start time of the manufacturing process of the manufacturing device 20 identified by device ID "M_0001" is 10:00, that the work executed by the worker in the manufacturing process is work A, and that the manufacturing device 20 is in a status of manufacturing the product.

The process information element 472 includes manufacturing start time "10:30", work name "work B" and status "preparation complete" in association with device ID "M_0002". The process information element 472 indicates that the start time of the manufacturing process of the manufacturing device 20 identified by device ID "M_0002" is 10:30, that the work executed by the worker in the manufacturing process is work B, and that preparation of the manufacturing device 20 for manufacturing the product is complete (i.e., start of the manufacturing is waited).

The process information element 473 includes manufacturing start time "11:30", work name "work C" and status "preparation incomplete" in association with device ID "M_0003". The process information element 473 indicates that the start time of the manufacturing process of the manufacturing device 20 identified by device ID "M_0003" is 11:30, that the work executed by the worker in the manufacturing process is work C, and that the preparation of the manufacturing device 20 for manufacturing the product is incomplete.

The process information element 474 includes manufacturing start time "12:30", work name "work D" and status "preparation incomplete" in association with device ID "M_0004". The process information element 474 indicates that the start time of the manufacturing process of the manufacturing device 20 identified by device ID "M_0004" is 12:30, that the work executed by the worker in the manufacturing process is work D, and that the preparation of the manufacturing device 20 for manufacturing the product is incomplete.

The process information elements 471 to 474 alone have been explained with reference to FIG. 13, but the process information storage 47 stores the process information about all the manufacturing devices 20 installed in the work area 100.

Next, a procedure of the status estimation processing in the present embodiment will be explained with reference to a flowchart shown in FIG. 14.

First, the receiver 41 in the management server 40 receives the biometric information and the acceleration information of the target worker from the target worker terminal 10 (block B21).

The receiver 41 receives the position information of the target worker and the status information of the manufacturing device 20, besides the biometric information and the acceleration of the target worker. If the information is received by the receiver 41, for example, (the position information and the status included in) the worker information and (the status included in) the process information are updated, based on the position information of the target worker, the status information of the manufacturing device 20, etc.

Next, processing of blocks B22 and B23 corresponding to the processing of blocks B2 and B3 shown in FIG. 8 is executed.

It can be estimated whether, for example, the target worker is executing the work (i.e., working) or not, based on (variation in) the acceleration indicated by the acceleration information of the target worker received in block B21.

For this reason, if it is determined in block B3 that the concentration of the target worker is greater than or equal to the threshold value (YES in block B23) and the target worker is estimated to be concentrating, the estimator 43 determines whether the target worker is (in a status of) working or not, based on the acceleration indicated by the acceleration information of the target worker received in block B21 (block B24).

If it is determined that the target worker is working (YES in block B24), the processing of block B25 corresponding to the processing of block B4 shown in FIG. 8 is executed.

If it is determined that the target worker is not working (NO in block B24), the processing of block B25 is not executed and the status estimation processing is ended.

Figures 14, 15:
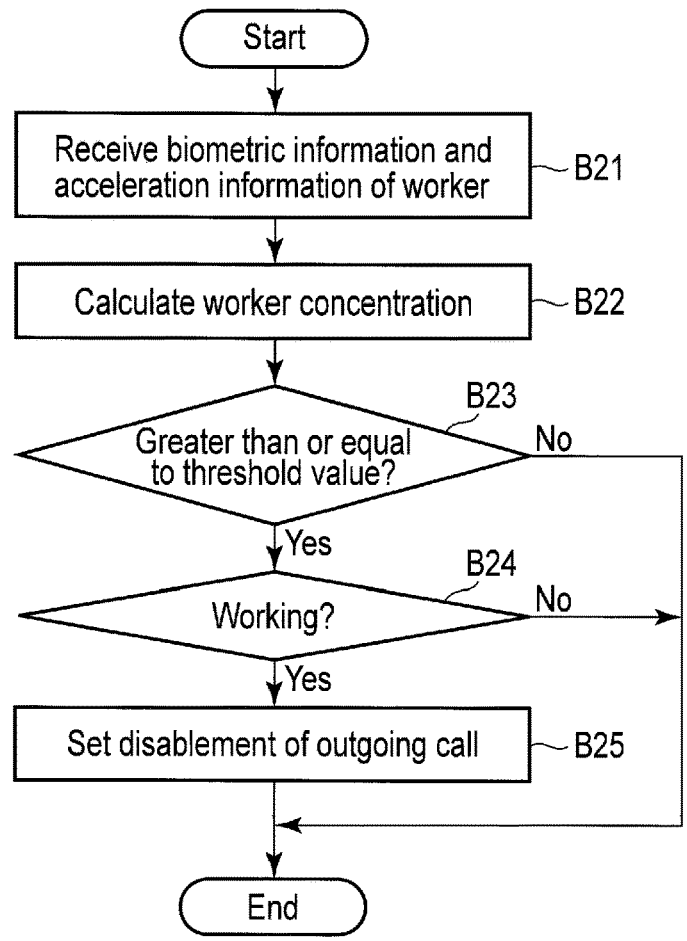
FIG. 14 is a flowchart showing a processing procedure of status estimation processing.
FIG. 15 is a table showing an example of a data structure of process information stored in process information storage of a third embodiment.

In the processing shown in FIG. 14, if the target worker is estimated to be concentrating and working, the disablement of outgoing call to the target worker terminal 10 is set. In the present embodiment, for example, the processing of block B23 may be omitted. In this case, if the target worker is working, the disablement of outgoing call to the target worker terminal 10 can be set.

It is determined whether the target worker is working or not, based on the acceleration indicated by the acceleration information of the target worker but, in some cases, the acceleration does not occur on the worker terminal (eyeglasses-type wearable terminal) 10 in accordance with the work (content) and it often cannot be detected that the target worker is working. For this reason, it may be determined in block B24 whether the target worker is working or not, based on, for example, the information (worker information or process information) stored in the worker information storage 46 or the process information storage 47. More specifically, for example, if the status included in the worker information in association with the worker ID to identify the target worker indicates that the target worker is working, it may be determined that the target worker is working. In addition, for example, if the status included in the process information in association with the device ID to identify the manufacturing device 20 installed in close vicinity to the target worker indicates that the manufacturing device 20 is manufacturing (i.e., the target manufacturing device 20 is being operated), it may be determined that the target worker is working. The manufacturing device 20 installed in close vicinity to the target worker is specified, based on the position information of the target worker received from the target worker terminal 10 and the position information of the manufacturing device 20 preliminarily held in the management server 40. It may be determined whether the target worker is working or not, based on the acceleration information, worker information and process information of the target worker.

Figure 9:
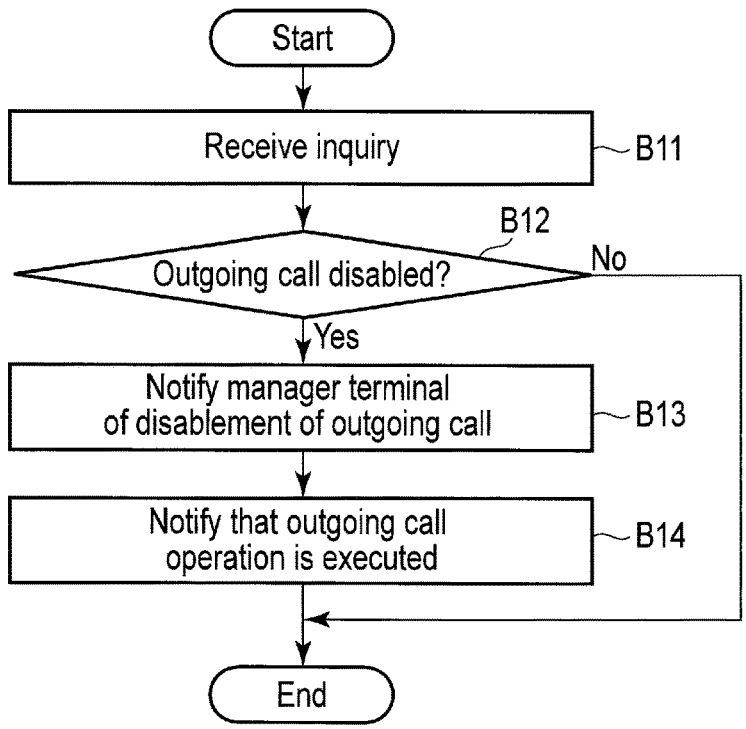
FIG. 9 is a flowchart for explanation of an example of disablement processing.

If the manager executes the outgoing call operation to the worker at the manager terminal 30 after the disablement of outgoing call to the worker terminal 10 is set by executing the processing shown in FIG. 14, the processing explained with reference to FIG. 9 is executed, but detailed explanations of this process are omitted in the present embodiment.

The output destination (display or LED lamp) of the notification is changed at the worker terminal 10, based on whether the worker is concentrating or not in the first embodiment but, in the present embodiment, the output destination of the notification may be changed based on whether the worker is concentrating or not.

In the present embodiment, as explained above, if the worker is estimated to be concentrating and if the worker is determined to be working, the outgoing call to the worker terminal 10 is set to be disabled.

It should be noted that whether the worker is working or not is determined based on the acceleration measured by the acceleration sensor 18 mounted in the worker terminal 10 as explained above. In addition, whether the worker is working or not may be determined based on the position information (first position information) of the manufacturing device 20, the worker position information (second position information), and the status information of the manufacturing device 20.

In such a configuration, it can be avoided that the outgoing call from the manager to the worker is canceled even if the worker is not working. Accordingly, the manager can efficiently give an instruction to (i.e., establish communication with) the worker.

Third Embodiment

Next, a third embodiment will be described. The present embodiment is different from the second embodiment with respect to a data structure of process information stored in process information storage 47 incorporated in a management server 40.

FIG. 15 is a table showing an example of the data structure of the process information stored in the process information storage 47 of the present embodiment. As shown in FIG. 15, the process information stored in the process information storage 47 includes a manufacturing start time, a work name, a status and a continuation flag in association with a device ID. The device ID, the manufacturing start time, and the status have been explained with reference to FIG. 13, and their detailed explanations are omitted.

The continuation flag indicates whether the work indicated by the work name associated with the continuation flag is a work which should be continued or not. The continuation flag includes a flag "◯" representing the work which should be continued or a flag "X" representing the work which should not be continued, and is preliminarily set based on whether the work is a work which the manager wishes to be continued.

In the example shown in FIG. 15, the process information storage 47 stores process information elements 471a, 472a, 473a, and 474a. The process information elements 471a, 472a, 473a, and 474a are the information obtained by adding continuation flags to the respective process information elements 471 to 474 shown in FIG. 13. For this reason, the process information elements 471a, 472a, 473a, and 474a are hereinafter explained with respect to differences from the process information elements 471 to 474.

The process information element 471a includes continuation flag "○". The process information element 471a indicates that the work indicated by work name "work A" (i.e., the work executed by the worker in the manufacturing process of the manufacturing device 20 identified by the device ID "M_0001") is the work which should be continued.

The process information element 472a includes continuation flag "○". The process information element 472a indicates that the work indicated by work name "work B" (i.e., the work executed by the worker in the manufacturing process of the manufacturing device 20 identified by the device ID "M_0002") is the work which should be continued.

The process information element 473a includes continuation flag "X". The process information element 473a indicates that the work indicated by work name "work C" (i.e., the work executed by the worker in the manufacturing process of the manufacturing device 20 identified by the device ID "M_0003") is the work which should not be continued.

The process information element 474a includes continuation flag "X". The process information element 474a indicates that the work indicated by work name "work D" (i.e., the work executed by the worker in the manufacturing process of the manufacturing device 20 identified by the device ID "M_0004") is the work which should be continued.

In the present embodiment, an estimator 43 determines (estimates) whether the work executed by the worker is the work which should be continued or not, by using the continuation flag. The estimator 43 sets the disablement of outgoing call to the worker terminal 10, based on the determination result.

Next, a procedure of the status estimation processing of the present embodiment will be explained with reference to a flowchart shown in FIG. 16.

First, processing of blocks B31 to B34 corresponding to the processing of blocks B21 to B24 shown in FIG. 14 is executed.

It is determined in block B34 whether the target worker is working or not, based on (the variation in) the acceleration indicated by the acceleration information of the target worker received in block B31 but, in some cases, specific vibration (acceleration) occurs on the target worker at a specific work and the work (content) which the target worker is executing can be specified (estimated) based on the acceleration. The (pattern of) acceleration occurring at each work is preliminarily held in the management server 40.

For this reason, if it is determined in block B34 that the target worker is working (YES in block B34), the estimator 43 acquires the continuation flag included in the process information in association with the work name indicating the work specified as explained above (hereinafter called the work of the target worker).

Next, the estimator 43 determines whether the work of the target worker is the work which should be continued or not, based on the acquired continuation flag. More specifically, if the continuation flag acquired by the estimator 43 is "○", it is determined that the work of the target worker is the work which should be continued. If the continuation flag acquired by the estimator 43 is "X", it is determined that the work of the target worker is not the work which should be continued.

If it is determined that the work of the target worker is the work which should be continued (YES in block B35), the processing of block B36 corresponding to block B25 shown in FIG. 14 is executed.

If it is determined that the work of the target worker is not the work which should be continued (NO in block B35), the processing of block B36 is not executed and the status estimation processing is ended.

Figure 16:
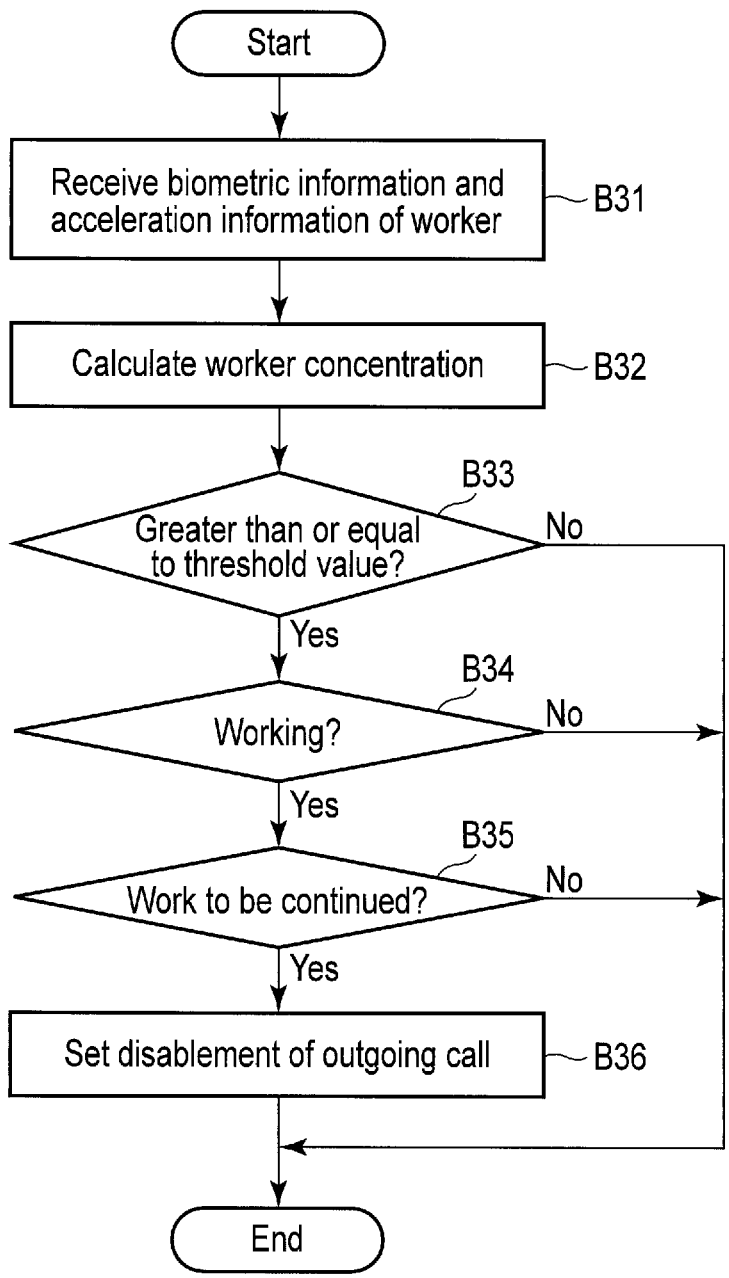
FIG. 16 is a flowchart showing a processing procedure of status estimation processing.

In the processing shown in FIG. 16, if the target worker is estimated to be concentrating and executing the work which should be continued, the disablement of outgoing call to the target worker terminal 10 is set.

It should be noted that at least one processing of blocks B33 to B35 may be omitted. More specifically, in the case where the processing of block B33 is omitted, the disablement of outgoing call to the target worker terminal 10 may be set if the target worker is executing the work which should be continued (i.e., working).

In FIG. 16, the work (content) of the target worker is specified based on the acceleration information before the processing of block B35 but the work of the target worker may be estimated based on, for example, the information (worker information or process information) stored in the worker information storage 46 or the process information storage 47. More specifically, if the status included in the worker information about the target worker is "working" and, for example, if the status included in the process information in association with the device ID to identify the manufacturing device 20 installed in close vicinity to the target worker is "manufacturing", it can be specified (estimated) that the work indicated by the work name included in the process information is the work of the target worker.

In addition, if the status information received from the manufacturing device 20 installed in close vicinity to the target worker includes the operation (content) executed for the manufacturing device 20, the work content of the target worker can be specified based on the operation, etc., in some cases. For this reason, each manufacturing device 20 may transmit the status information including the operation executed for the manufacturing device 20 to the management server 40. Each manufacturing device 20 may also transmit to the management server 40 the status information including the name of the work estimated to be currently executed in accordance with the operation executed for the manufacturing device 20 and the operation status of the manufacturing device 20, etc.

If the manager executes the outgoing call operation for the worker at the manager terminal 30 after the disablement of outgoing call to the worker terminal 10 is set by executing the processing shown in FIG. 16, the processing explained with reference to FIG. 9 is executed, but detailed explanations of this process are omitted in the present embodiment.

In the present embodiment, the output destination (display or LED lamp) of the notification to the worker terminal 10 may be changed based on whether the work of worker is the work which should be continued or not.

In the present embodiment, as explained above, if the work of the worker is further determined to be the work which should be continued, the outgoing call to the worker terminal 10 is set to be disabled, as compared with the second embodiment.

It should be noted that the work (content) of the worker is specified based on the acceleration measured by the acceleration sensor 18 mounted in the worker terminal 10. In addition, the work of the worker may be determined based on the position information (first position information) of the manufacturing device 20, the worker position information (second position information), the status information of the manufacturing device 20, etc.

In such a configuration, it can be avoided that the outgoing call from the manager to the worker is canceled even if the work of the worker is not the work which should be continued (i.e., the work which may be suspended). Accordingly, the manager can efficiently give an instruction to (i.e., establish communication with) the worker.

Fourth Embodiment

Next, a fourth embodiment will be described. The present embodiment is different from the third embodiment in the way that a management server 40 includes device information storage 48 as shown in FIG. 17.

The device information storage 48 stores information about the manufacturing device 20 installed in the work area 100 (hereinafter called device information).

Figures 17, 18:
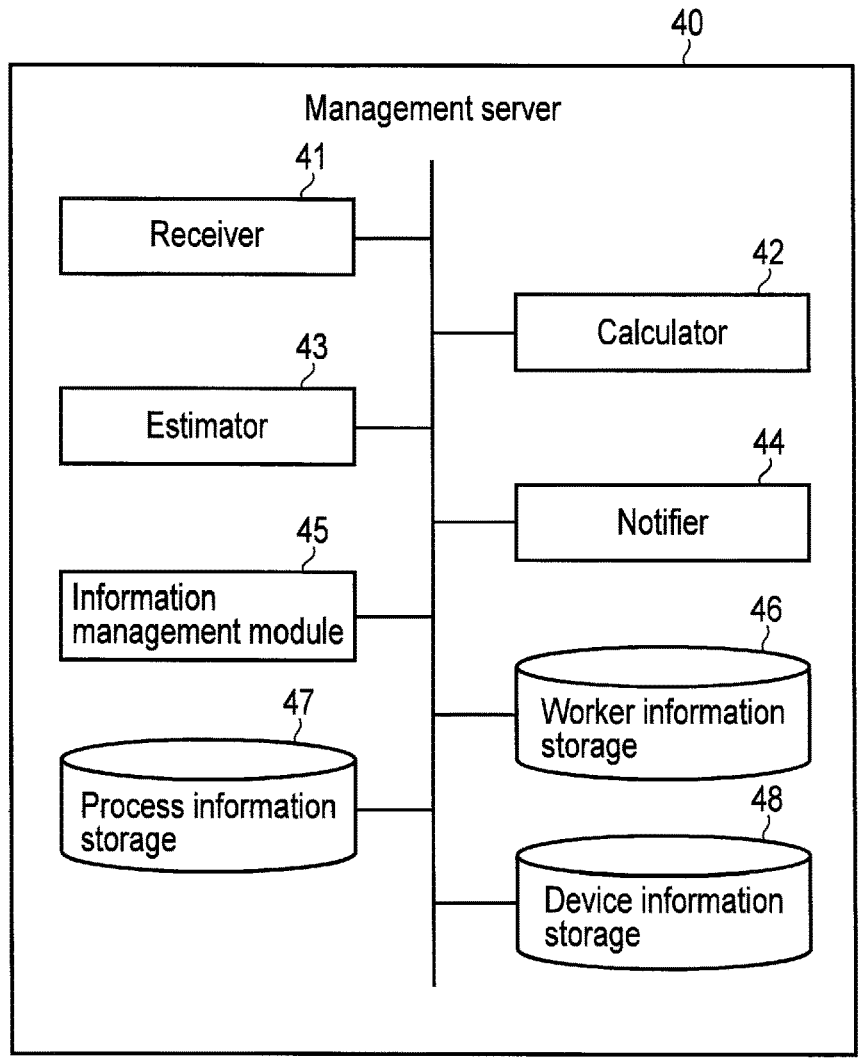
FIG. 17 is a block diagram showing an example of a functional configuration of a management server of fourth embodiment.
FIG. 18 is a table showing an example of a data structure of device information stored in device information storage.

FIG. 18 shows an example of a data structure of the device information stored in the device information storage 48. As shown in FIG. 18, the device information stored in the device information storage 48 includes position information of the manufacturing device 20 and the risk about the manufacturing device 20 (hereinafter called a device risk), in association with a device ID to identify the manufacturing device 20.

In the example shown in FIG. 18, the device information storage 48 stores device information elements 481 to 483.

The device information element 481 includes position information "Xd1, Yd1" and device risk "5" in association with device ID "M_0001". The device information element 481 indicates that the manufacturing device 20 identified by device ID "M_0001" is installed at a position indicated by position information "Xd1, Yd1" and that the device risk of the manufacturing device 20 is 5.

The device information element 482 includes position information "Xd2, Yd2" and device risk "4" in association with device ID "M_0001". The device information element 482 indicates that the manufacturing device 20 identified by device ID "M_0002" is installed at a position indicated by position information "Xd2, Yd2" and that the device risk of the manufacturing device 20 is 4.

The device information element 483 includes position information "Xd3, Yd3" and device risk "1" in association with device ID "M_0003". The device information 483a indicates that the manufacturing device 20 identified by device ID "M_0003" is installed at a position indicated by position information "Xd3, Yd3" and that the device risk of the manufacturing device 20 is 1.

The device risk included in the device information is assumed to be represented by, for example, numbers 1 to 5. In this case, for example, device risk "1" represents the lowest risk (i.e., safest) and device risk "5" represents the highest risk (i.e., most dangerous). The device risk is assumed to be determined by considering not only the risk in the operation of the manufacturing device 20, etc., but also the installation position of the manufacturing device 20 (for example, installation at a high position).

The device information elements 481 to 483 alone have been explained with reference to FIG. 18, but the device information storage 45 stores the device information about all the manufacturing devices 20 installed in the work area 100.

In the present embodiment, an estimator 43 determines (estimates) whether the worker is in a dangerous status or not, with the device information. The estimator 43 sets the disablement of outgoing call to the worker terminal 10, based on the determination result.

Next, a procedure of the status estimation processing of the present embodiment will be explained with reference to a flowchart of FIG. 19.

First, a receiver 41 in a management server 40 receives biometric information, acceleration information and position information of a target worker from a target worker terminal 10 (block B41).

The biometric information of the target worker is the information about the living body of the target worker acquired by the line-of-sight detection sensor 14, the pulse wave sensor 15, and the eye potential sensor 16 mounted in the target worker terminal 10 as explained in the first embodiment. The acceleration information of the target worker is the information indicating the acceleration measured by the acceleration sensor 18 mounted in the target worker terminal 10 as explained in the second embodiment. The position information of the target worker is the information indicating the position of the target worker detected by the GPS sensor 19 mounted in the target worker terminal 10 as explained in the second embodiment.

Next, processing of blocks B42 to B45 corresponding to the processing of blocks B32 to B35 shown in FIG. 16 is executed.

If it is determined in block B45 that the work of the target worker is the work which should be continued (YES in block B45), the estimator 43 determines whether the target worker is in a dangerous status or not, based on the position information of the target worker acquired in block B1 and the device information stored in the device information storage 48 (block B46).

The processing of block B46 will be explained here. First, the estimator 43 specifies the manufacturing device 20 installed in close vicinity to the target worker, based on each of the position information elements included in the device information stored in the device information storage 48, and the position information of the target worker received in block B41.

More specifically, the estimator 43 calculates a distance between the position indicated by the position information included in each of the device information elements and the position indicated by the position information of the target worker, and specifies the manufacturing device 20 in which the distance from the target worker is smaller than or equal to a predetermined value as the manufacturing device 20 installed in close vicinity to the target worker. If no manufacturing device 20 is installed in close vicinity to the target worker (i.e., if the distance from the target worker is not smaller than or equal to the predetermined value in any manufacturing devices 20), it is determined in block B46 that the target worker is not in a dangerous status.

In the following explanations, the specified manufacturing device 20 (i.e., the manufacturing device installed in close vicinity to the target worker) is called the target manufacturing device 20 for convenience.

Next, the estimator 43 acquires the device risk included in the device information about the target manufacturing device 20 stored in the device information storage 48 (i.e., the device risk of the target manufacturing device 20). In this case, the estimator 43 acquires the device risk included in the device information, in association with the device ID to identify the target manufacturing device 20.

The estimator 43 determines whether the device risk of the target manufacturing device 20 is high or not. In this case, if the device risk of the target manufacturing device 20 is greater than or equal to the predetermined value, the estimator 43 determines that the device risk of the target manufacturing device 20 is high. If the device risk of the target manufacturing device 20 is not greater than or equal to the predetermined value, the estimator 43 determines that the device risk of the target manufacturing device 20 is not high.

If the device risk of the target manufacturing device 20 is determined to be high, the estimator 43 determines (estimates) that the target worker is in a dangerous status in block B46.

If the target worker is determined to be in a dangerous status (YES in block B46), the processing of block B47 corresponding to the processing of block B36 shown in FIG. 16 is executed.

If it is determined that the target worker is not in a dangerous status (NO in block B46), the processing of block B47 is not executed, and the status estimation processing is ended.

In the processing shown in FIG. 19, if the target worker is concentrating and executing the work which should be continued, and if the target worker is estimated to be in a dangerous status, the disablement of outgoing call to the target worker terminal 10 is set.

It should be noted that at least one processing of blocks B43 to B46 may be omitted. More specifically, for example, in the case where the processing of block B43 is omitted, if the target worker is executing the work which should be continued and if the target worker is in a dangerous status, the disablement of outgoing call to the target worker terminal 10 may be set. In addition, for example, in the case where the processing of block B45 is omitted, if the target worker is concentrating and executing the work and if the target worker is in a dangerous status, the disablement of outgoing call to the target worker terminal 10 may be set.

If the manager executes the outgoing call operation for the worker at the manager terminal 30 after the disablement of outgoing call to the worker terminal 10 is set by executing the processing shown in FIG. 19, the processing explained with reference to FIG. 9 is executed, but detailed explanations of this process are omitted in the present embodiment.

In the present embodiment, the output destination (display or LED lamp) of the notification to the worker terminal 10 may be changed based on whether the worker is in a dangerous status or not.

In the present embodiment, as explained above, if the worker is further determined to be in a dangerous status, the outgoing call to the worker terminal 10 is set to be disabled, as compared with the third embodiment.

In the present embodiment, the outgoing call from the manager to the worker can be canceled to complete the work early if the worker is concentrating and executing the work which should be continued, in a dangerous status (i.e., in close vicinity to the manufacturing device 20 of high device risk) and, in the other cases, the manager can give an instruction to (i.e., establish communication with) the worker without canceling the outgoing call.

In the present embodiment, it is determined whether the worker is in a dangerous status or not based on the device risk of the manufacturing device 20 but, for example, the worker may be determined to be in a dangerous status if the position in the height direction of the worker is higher than a predetermined position (height) (i.e., if the worker is located at a high position). In this case, the worker terminal 10 is assumed to include a barometric pressure sensor capable of measuring a barometric pressure on the periphery of the worker terminal 10. In such a configuration, (information indicating) the position in the height direction of the worker can be obtained based on (variation in) the barometric pressure measured by the barometric pressure sensor. The position in the height direction of the worker may be estimated based on, for example, an image showing the worker as captured by a camera provided in the work area 100 or an image showing the worker's periphery as captured by the camera 1003 mounted in the worker terminal 10.

If the incoming call is made from the manager when the worker is in a dangerous status (for example, the worker is located at a high position), for example, the worker willing to respond to the call may be involved in an unexpected accident. For this reason, if the worker is in a dangerous status, the disablement of outgoing call to the target worker terminal 10 worn by the worker may be set. In other words, for example, if the worker is concentrating and executing the work which should be continued or if the worker is in a dangerous status, the disablement of outgoing call to the worker terminal 10 can also be set.

Furthermore, since the work (content) which the worker is executing based on the acceleration information of the worker can be specified as explained above, it may be determined that the worker is in a dangerous status if a risk about the work which the worker is executing is high. In this case, the risk may be held in the management server 40 for each work.

According to at least one of the above-explained embodiments, the status of the worker (user) executing the work in a predetermined range can be estimated.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method comprising:
setting a light color in accordance with an environment in use of an eyeglasses-type wearable terminal including a display and a dimming-type white light emitting diode (LED) being separate from the display, the LED including a plurality of light emitting diodes and light output from each of the plurality of light emitting diodes is independently controlled;
receiving biometric information about a living body of the user wearing the eyeglasses-type wearable terminal, the eyeglasses-type wearable terminal being configured to enable the user to execute speech communication and working in a predetermined range, the biometric information being obtained by a first sensor mounted in the eyeglasses-type wearable terminal;
determining that the user is concentrating, based on the received biometric information;

setting an outgoing call to the eyeglasses-type wearable terminal to be disabled in a manager terminal for use in managing the user if it is determined that the user is concentrating;
turning on the LED mounted at the eyeglasses-type wearable terminal without display of the outgoing call when an operation for the outgoing call to the eyeglasses-type wearable terminal is executed for the manager terminal while the outgoing call to the eyeglasses-type wearable terminal is set to be disabled; and
displaying a message on the display of the eyeglasses-type wearable terminal when a concentrating status of the user becomes a non-concentrating status after the LED is turned on.

2. The method of claim 1, wherein
the first sensor comprises at least one of (i) a line-of-sight detection sensor configured to detect a line-of-sight direction of the user, (ii) a pulse wave sensor configured to measure a pulse wave of the user, or (iii) an eye potential sensor configured to measure an eye potential of the user,
the biometric information comprises at least one of a variation amount of the line-of-sight direction of the user obtained by the line-of-sight detection sensor, a pulse rate of the user obtained by the pulse wave sensor, or a number of times of blinking of the user obtained by the eye potential sensor, and
the determining whether the user is concentrating comprises:
calculating a concentration value which indicates a degree to which the user is concentrating, based on the biometric information;
determining whether the calculated concentration value is greater than or equal to a predetermined value; and
estimating that the user is concentrating if the calculated concentration value is greater than or equal to the predetermined value.

3. The method of claim 1, further comprising:
outputting a notification including information that the outgoing call is disabled to the manager terminal if the outgoing call is set to be disabled and if the operation for the outgoing call is executed for the manager terminal.

4. The method of claim 1, further comprising:
receiving, from the eyeglasses-type wearable terminal, an acceleration measured by a second sensor mounted in the eyeglasses-type wearable terminal; and
determining whether the user is working, based on the received acceleration,
wherein the outgoing call is set to be disabled when the determining that the user is working and determining an estimation that the user is concentrating.

5. The method of claim 4, further comprising:
responsive to determining that the user is working, specifying a work which the user is executing, based on the received acceleration; and
determining whether the specified work should be continued,
wherein the outgoing call is set to be disabled upon determining that the specified work should be continued.

6. The method of claim 1, further comprising:
receiving status information from a device indicating a status of the device used by the user working in the predetermined range;
determining that the status of the device identifies that the user is working based on first position information indicating a position of the device, second position information indicating a position of the user, and the received status information;
upon determining that the user is working, specifying a type of work that is being performed by the user based on the first position information, the second position information, and the status information; and
determining whether the specified work is a type of work that should be continued,
wherein the outgoing call is set to be disabled upon a determination that the user is concentrating and the specified work is a work which should be continued.

7. The method of claim 1, wherein the LED and the display screen are visible to the user when the eyeglasses-type wearable terminal is worn.

8. The method of claim 1 further comprising:
setting a sound at the eyeglasses-type wearable terminal not to be output when the outgoing call to the eyeglasses-type wearable terminal is set to be disabled.

9. A method, comprising:
setting a light color in accordance with an environment in use of a user terminal including a display and a dimming-type white light emitting diode (LED) being separate from the display, the LED including a plurality of light emitting diodes and light output from each of the plurality of light emitting diodes is independently controlled;
receiving biometric information about a living body of a user working in a predetermined range, from the user terminal, the user terminal being configured to enable the user to execute speech communication, the biometric information being obtained by a first sensor mounted in the user terminal;
determining that the user is concentrating, based on the received biometric information; and
setting an outgoing call to the user terminal to be disabled in a manager terminal for use in managing the user if it is determined that the user is concentrating, wherein
turning on the LED mounted at the user terminal without display of the outgoing call when an operation for the outgoing call to the user terminal is executed for the manager terminal while the outgoing call to the user terminal is set to be disabled, and
displaying a message on the display of the user terminal when a concentrating status of the user becomes a non-concentrating status after the LED is turned on.

10. The method of claim 9, wherein the first sensor comprises a line-of-sight detection sensor configured to detect a line-of-sight direction of the user; and
the biometric information comprises at least a variation amount of the line-of-sight direction of the user obtained by the line-of-sight detection sensor.

11. The method of claim 9, wherein the first sensor comprises at least an eye potential sensor configured to measure an eye potential of the user, and the biometric information comprises at least a measured number of times of the user blinking obtained by the eye potential sensor.

12. The method of claim 9, wherein the first sensor comprises a pulse wave sensor configured to measure a pulse wave of the user and the biometric information comprises at least a pulse rate of the user obtained by the pulse wave sensor.

13. The method of claim 9, wherein the determining whether the user is concentrating comprises:
calculating a concentration which indicates a degree to which the user is concentrating, based on the biometric information;

determining whether the calculated concentration is greater than or equal to a predetermined value; and estimating that the user is concentrating if the calculated concentration is greater than or equal to the predetermined value.

14. The method of claim 9, wherein the first sensor comprises any of a line-of-sight detection sensor configured to detect a line-of-sight direction of the user, a pulse wave sensor configured to measure a pulse wave of the user, or an eye potential sensor configured to measure an eye potential of the user, the biometric information comprises information detected by the first sensor, the biometric information includes at least one of (i) a variation amount of the line-of-sight direction of the user obtained by the line-of-sight detection sensor, (ii) a pulse rate of the user obtained by the pulse wave sensor, or (iii) number of times of the user blinks as obtained by the eye potential sensor.

15. The method of claim 9, further comprising:

outputting a notification including information that the outgoing call is disabled to the manager terminal if the outgoing call is set to be disabled and if the operation for the outgoing call is executed for the manager terminal used by the manager.

16. The method of claim 9, further comprising:

receiving, from the eyeglasses-type wearable terminal, an acceleration measured by a second sensor mounted in the eyeglasses-type wearable terminal; and determining whether the user is working, based on the received acceleration, wherein the outgoing call is set to be disabled when the user is working and an estimation of the user is concentrating is determined.

17. An electronic apparatus connected to an eyeglasses-type wearable terminal configured to enable a user to execute speech communication, the electronic apparatus comprising:

a receiver configured to receive biometric information about a living body of the user from the eyeglasses-type wearable terminal being worn by the user, wherein the eyeglasses-type wearable terminal including a display and a dimming-type white light emitting diode (LED) being separate from the display and the LED including a plurality of light emitting diodes in which light output from each of the plurality of light emitting diodes is independently controlled, the biometric information being obtained by a first sensor mounted in the eyeglasses-type wearable terminal; and a hardware processor configured to:

determine that the user is concentrating, based on the received biometric information; and set an outgoing call to the eyeglasses-type wearable terminal to be disabled in a manager terminal for use in managing the user if it is determined that the user is concentrating, wherein turning on the LED mounted at the eyeglasses-type wearable terminal without display of the outgoing call when an operation for the outgoing call to the eyeglasses-type wearable terminal is executed for the manager terminal while the outgoing call to the eyeglasses-type wearable terminal is set to be disabled, and displaying a message on the display of the eyeglasses-type wearable terminal when a concentrating status of the user becomes a non-concentrating status after the LED is turned on.

18. The electronic apparatus of claim 17, wherein each of the plurality of light emitting diodes emits a different color light.

19. The electronic apparatus of claim 17, further comprising a switch to adjust display luminance and color tone of light emitted from the LED mounted at the user terminal.

20. An electronic apparatus connected to an eyeglasses-type wearable terminal configured to enable a user to execute speech communication, the electronic apparatus comprising:

means for receiving biometric information about a living body of a user from a user terminal, the user terminal including a display and a dimming-type white light emitting diode (LED) being separate from the display and the LED including a plurality of light emitting diodes in which light output from each of the plurality of light emitting diodes is independently controlled, the biometric information being obtained by a first sensor mounted in the user terminal;

means for determining that the user is concentrating based on the received biometric information; and means for setting an outgoing call to the user terminal to be disabled in a manager terminal for use in managing the user if it is determined that the user is concentrating, wherein when an operation for the outgoing call to the user terminal is executed for the manager terminal while the outgoing call to the user terminal is set to be disabled, the LED mounted at the user terminal is turned on without display of any outgoing calls, and when a concentrating status of the user becomes a non-concentrating status, the LED is turned on, a message is displayed on the display of the eyeglasses-type wearable terminal.

21. The electronic apparatus of claim 20, wherein the first sensor comprises any of a line-of-sight detection sensor configured to detect a line-of-sight direction of the user, a pulse wave sensor configured to measure a pulse wave of the user, or an eye potential sensor configured to measure an eye potential of the user.

22. The electronic apparatus of claim 20 further comprising a switch to adjust display luminance and color tone of light emitted from the LED.

23. The electronic apparatus of claim 20, wherein the LED mounted at the eyeglasses-type wearable terminal being configured as a plurality of light emitting diodes and a light output from each of the plurality of light emitting diode can be varied independently.

24. The electronic apparatus of claim 20, wherein each of the plurality of light emitting diodes emits a different color light.

* * * * *